United States Patent
Khan et al.

(10) Patent No.: US 12,493,957 B1
(45) Date of Patent: Dec. 9, 2025

(54) PARKINSON DISEASE PREDICTION USING MAGNETIC RESONANCE IMAGING (MRI) BASED ON A CONVOLUTIONAL BLOCK ATTENTION MODULE AND EXPLAINABLE AI ARCHITECTURE (C3BAM-XAI) ARCHITECTURE

(71) Applicant: PRINCE MOHAMMAD BIN FAHD UNIVERSITY, Dhahran (SA)

(72) Inventors: Muhammad Attique Khan, Dhahran (SA); Khaled S. Fawagreh, Dhahran (SA)

(73) Assignee: PRINCE MOHAMMAD BIN FAHD UNIVERSITY, Dhahran (SA)

( * ) Notice: Subject to any disclaimer, the term of this patent is extended or adjusted under 35 U.S.C. 154(b) by 0 days.

(21) Appl. No.: 19/297,846

(22) Filed: Aug. 12, 2025

(51) Int. Cl.
*G06T 7/00* (2017.01)
*A61B 5/00* (2006.01)
(Continued)

(52) U.S. Cl.
CPC .......... *G06T 7/0012* (2013.01); *A61B 5/0042* (2013.01); *A61B 5/055* (2013.01);
(Continued)

(58) Field of Classification Search
CPC ......... G06T 2207/20084; G06T 7/0012; G06T 2207/30016; G06T 2207/10088;
(Continued)

(56) References Cited

U.S. PATENT DOCUMENTS

2025/0238925 A1 * 7/2025 Chan ............... G06V 10/82

FOREIGN PATENT DOCUMENTS

| CN | 113362320 A | | 9/2021 | |
|---|---|---|---|---|
| CN | 117541774 A | * | 2/2024 | ............ G06V 10/25 |
| CN | 118799298 A | | 10/2024 | |

OTHER PUBLICATIONS

Woo et al., CBAM: Convolutional Block Attention Module, Jul. 18, 2018 [retrieved Sep. 29, 2025], Cornell University: arXiv, version: [v2], 17 pages. https://doi.org/10.48550/arXiv.1807.06521 (Year: 2018).*

(Continued)

*Primary Examiner* — Henok Shiferaw
*Assistant Examiner* — Dennis Rosario
(74) *Attorney, Agent, or Firm* — Oblon, McClelland, Maier & Neustadt, L.L.P.

(57) ABSTRACT

A computer-implemented system, and method for classifying Parkinson's Disease (PD) from magnetic resonance imaging (MRI) data. The method includes receiving an MRI image. The method includes processing the MRI image through a C3BAM-Net convolutional neural network (CNN) architecture to obtain a plurality of attention-enhanced feature maps. The method includes classifying the input MRI image into one of a plurality of the PD categories based on the plurality of attention-enhanced feature maps. Where the C3BAM-Net CNN includes a plurality of convolutional layers, a plurality of Rectified Linear Unit (ReLU) activations, a plurality of max pooling layers, a plurality of Convolutional Block Attention Modules (CBAMs), a flattening layer, and a plurality of dense layers. The method includes each CBAM of the plurality of CBAMs includes a Channel Attention Module (CAM) and a Spatial Attention Module (SAM) arranged sequentially.

20 Claims, 14 Drawing Sheets

(51) Int. Cl.

| | |
|---|---|
| *A61B 5/055* | (2006.01) |
| *G06N 3/02* | (2006.01) |
| *G06N 3/045* | (2023.01) |
| *G06N 3/0464* | (2023.01) |
| *G06N 5/045* | (2023.01) |
| *G06N 20/00* | (2019.01) |
| *G06V 10/50* | (2022.01) |
| *G06V 10/70* | (2022.01) |
| *G06V 10/764* | (2022.01) |
| *G06V 10/77* | (2022.01) |
| *G06V 10/80* | (2022.01) |
| *G06V 10/82* | (2022.01) |
| *G06V 20/70* | (2022.01) |
| *G06V 30/19* | (2022.01) |
| *G16H 30/40* | (2018.01) |
| *G16H 50/50* | (2018.01) |

(52) U.S. Cl.
CPC .......... *A61B 5/4082* (2013.01); *A61B 5/7264* (2013.01); *G06N 3/02* (2013.01); *G06N 3/045* (2023.01); *G06N 3/0464* (2023.01); *G06N 5/045* (2013.01); *G06N 20/00* (2019.01); *G06V 10/50* (2022.01); *G06V 10/70* (2022.01); *G06V 10/764* (2022.01); *G06V 10/765* (2022.01); *G06V 10/7715* (2022.01); *G06V 10/809* (2022.01); *G06V 10/82* (2022.01); *G06V 20/70* (2022.01); *G06V 30/19173* (2022.01); *G16H 30/40* (2018.01); *G16H 50/50* (2018.01); *A61B 2576/026* (2013.01); *G06T 2207/10088* (2013.01); *G06T 2207/20084* (2013.01); *G06T 2207/30016* (2013.01); *G06T 2207/30096* (2013.01); *G06T 2219/004* (2013.01); *G06V 2201/03* (2022.01)

(58) Field of Classification Search
CPC ..... G06T 2207/30096; G06T 2219/004; G06T 7/33; G06T 7/73; G16H 30/40; G16H 50/50; G06V 10/82; G06V 40/197; G06V 10/806; G06V 10/40; G06V 2201/03; G06V 10/764; G06V 10/765; G06V 10/7715; G06V 20/70; G06V 10/44; G06V 10/462; G06V 10/48; G06V 10/42; G06V 30/19173; G06V 40/168; G06V 40/171; G06V 10/809; G06V 10/811; G06V 10/70; G06V 10/72; G06V 10/74; G06V 10/758; G06V 10/766; G06V 10/77; G06V 10/771; G06V 10/467; G06V 10/50; G06V 10/454; G06N 3/045; G06N 3/0464; G06N 20/00; G06N 3/0895; G06N 3/09; G06N 3/02; G06N 5/045; A61B 5/7264; A61B 5/0042; A61B 5/4082; A61B 5/055; A61B 2576/026

See application file for complete search history.

(56) References Cited

OTHER PUBLICATIONS

George et al., An Efficient 3D CNN Framework with Attention Mechanisms for Alzheimer's Disease Classification, Jul. 28, 2023 [retrieved Sep. 29, 2025], vol. 47, No. 2, pp. 2097-2118. https://doi.org/10.32604/csse.2023.039262 (Year: 2023).*

Paul, Deep Learning-Based Method for Detecting Parkinson using 1D Convolutional Neural Networks and Improved Jellyfish Algorithms, 7.6.2024 [retrieved Sep. 29, 2025], International Journal of Electrical and Computer Engineering Systems, vol. 15 No. 6, pp. 515-522. https://doi.org/10.32985/ijeces. 15.6.5 (Year: 2024).*

Google Patents translation of CN-117541774-A to LI, Recognition method of early Parkinson's medical images based on improved YOLOv5 and CBMA, translated Sep. 29, 2025, 10 pages. (Year: 2025).*

Ibrahim et al., Chapter 18—Explainable convolutional neural network for Parkinson's disease detection, May 7, 2025 [STIC retrieved Sep. 30, 2025], Explainable AI in Healthcare Imaging for Medical Diagnoses, pp. 451-476. https://doi.org/10.1016/B978-0-443-23979-3.00018-X (Year: 2025).*

Sareer Ui Amin, et al., "Enhanced anomaly detection in pandemic surveillance videos: An attention approach with EfficientNet-B0 and CBAM integration", IEEE Access, vol. 12, Nov. 1, 2024, pp. 162697-162712.

Kamese Jordan Junior et al., "Alzheimer's multiclassification using explainable AI techniques", Applied Sciences, Sep. 14, 2024, vol. 14, Issue 18, 8287, pp. 1-15.

* cited by examiner

PARKINSON DISEASE PREDICTION USING MAGNETIC RESONANCE IMAGING (MRI) BASED ON A CONVOLUTIONAL BLOCK ATTENTION MODULE AND EXPLAINABLE AI ARCHITECTURE (C3BAM-XAI) ARCHITECTURE

STATEMENT OF PRIOR DISCLOSURE BY AN INVENTOR

Aspects of the present disclosure are described in Abbas, M. J.; Khan, M. A.; Hamza, A.; Alsenan, S.; Rehman, A.; Baili, J.; Zhang, Y. (2025) "C³BAM-XAI: Convolutional Block Attention Module Enhanced Explainable Artificial Intelligence-Based Parkinson's Disease Stage Classification" Cognitive Computation, 17, 111, which is incorporated herein by reference in its entirety.

STATEMENT OF ACKNOWLEDGEMENT

Support provided by the College of Computer Engineering and Science, Prince Mohammad Bin Fahd University (PMU), Al-Khobar, Saudi Arabia is gratefully acknowledged.

BACKGROUND

Technical Field

The present disclosure is directed to Parkinson's Disease (PD) prediction and, more particularly to a computer-implemented method for classifying the PD from magnetic resonance imaging (MRI) data.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Parkinson's disease (PD) is a chronic, progressive neurological disorder which affects motor function due to the gradual loss of dopamine-producing neurons in the brain. The PD is the most common neurodegenerative disease worldwide, with symptoms noticed around the age of 60, though a subset of patients may be diagnosed much earlier or much later.

Diagnosis of the PD is performed through clinical evaluation, including observation of the motor symptoms and the use of rating scales such as the Unified Parkinson's Disease Rating Scale (UPDRS). Widespread approaches in current practice exhibit inherent subjectivity, which may limit the ability to detect subtle pathological changes, particularly during early disease progression. Such limitations can contribute to delay in diagnosis and initiation of treatment.

In addition to clinical assessments, various diagnostic tools such as Magnetic Resonance Imaging (MRI), electromyography (EMG), and gait analysis have been employed to support diagnosis. However, techniques may be time-consuming, require expert interpretation, and may not always provide consistent results.

Machine learning (ML) technique may be applied to assist in the PD diagnosis by analyzing medical imaging and clinical data. Conventional ML approaches support vector machines, decision trees, and related classifiers. The conventional ML approaches have been delivering promising results. However, the ML technique requires manual feature extraction, a process involving handcrafted metrics or selected clinical variables, which limit scalability and adaptability. Moreover, the conventional ML technique suffers from inaccuracy and robustness when confronted with large-scale, heterogeneous, or high-dimensional datasets.

Recent developments in deep learning (DL), convolutional neural networks (CNNs), have shown some promising developments in medical imaging applications. The CNN models can automatically learn and extract features from the MRI and other diagnostic images and improve classification performance. Pre-trained and the DL technique have been applied in detection of the PD with better results, achieving higher accuracy and generalization than known conventional methods.

Despite recent advancements in the DL and the CNNs for medical imaging, diagnosing the PD continues to face formidable challenges. The Medical imaging datasets for the PD are often limited in size, imbalanced, and inconsistently labeled, while data privacy regulations further hinder large-scale collaboration. The CNN models lack interpretability, struggle with generalization across different scanners, institutions, and populations, and are prone to overfitting on irrelevant features. Training and tuning of the CNN models are time-consuming and resource-intensive. The CNN models require a substantial computational infrastructure and expertise. The CNN models may rely on static images without incorporating longitudinal or multimodal clinical data. The DL and the CNNs face challenges in identifying early-stage manifestations of the PD due to subtle imaging features. Continuous model updates and real-world deployment add further complexity and maintenance overhead. Integration of the DL and the CNN into clinical workflows remains limited. The existing tools do not adequately address demographic bias, reproducibility issues, or regulatory requirements. The existing tools are insufficient for clinical use. The existing tools validation processes are lengthy and demanding. The limitations constrain the scalability, efficiency, and clinical acceptance of the DL-based systems in the PD diagnosis.

As a result, there remains a need for improved, automated methods for detecting and classifying the PD that can enhance diagnostic accuracy and support clinical decision-making. Accordingly, one object of the present disclosure is to provide computer-implemented methods and systems for classifying the PD from the MRI data.

SUMMARY

In an exemplary embodiment a computer-implemented method for classifying Parkinson's Disease (PD) from magnetic resonance imaging (MRI) data is disclosed. The method includes receiving an MRI image. The method includes processing the MRI image through a C3BAM-Net convolutional neural network (CNN) architecture to obtain a plurality of attention-enhanced feature maps. The method classifying the input MRI image into one of a plurality of Parkinson's Disease categories based on the plurality of attention-enhanced feature maps. The method includes the C3BAM-Net CNN, which includes a plurality of convolutional layers, a plurality of Rectified Linear Unit (ReLU) activations, a plurality of max pooling layers, a plurality of Convolutional Block Attention Modules (CBAMs), a flattening layer, and a plurality of dense layers. The method includes each CBAM of the plurality of CBAMs consisting of a Channel Attention Module (CAM) and a Spatial Attention Module (SAM) arranged sequentially.

In some embodiments, the CBAM generates an attention-enhanced feature map by applying a channel attention weight and a spatial attention weight to an input feature map, then multiplying the input feature map.

In some embodiments, the CBAM generates an attention-enhanced feature map following a mathematical description as:

$$F'=M_s(M_c(F) \cdot F) \cdot F,$$

where F is an input feature map, $M_s$ denotes a spatial attention function, and $M_c$ denotes a channel attention function.

In some embodiments, the CAM generates a channel attention weight by processing feature maps using global average pooling and global max pooling.

In some embodiments, the CAM generates a channel attention weight following a mathematical description as:

$$M_c(F)=\sigma(W_2(\text{ReLU}(W_1(\text{AvgPool}(F)))))+\sigma(W_2(\text{ReLU}(W_1(\text{MaxPool}(F))))),$$

where $W_1$ and $W_2$ are weight matrices of a shared multi-layer perceptron (MLP), $\sigma$ denotes a sigmoid function, and F is an input feature map.

In some embodiments, the SAM generates a spatial attention weight by processing feature maps using channel-wise average pooling and max pooling.

In some embodiments, the SAM generates a spatial attention weight following a mathematical description as:

$$M_s(F)=\sigma(\text{Conv}([\text{AvgPool}(F); \text{MaxPool}(F)])),$$

where $\sigma$ is a sigmoid function, Conv denotes a convolutional operation, AvgPool denotes average pooling operation, and MaxPool denotes max pooling operation.

In some embodiments, the C3BAM-Net CNN has an input shape of 150×150×3.

In some embodiments, the C3BAM-Net CNN has an output shape of 5.

In some embodiments, the C3BAM-Net CNN has an architecture includes the architecture includes a first processing layer, a first CBAM coupled to the first processing layer, a second processing layer coupled to the first CBAM, a second CBAM coupled to the second processing layer, a third processing layer, coupled to the second CBAM, a third CBAM coupled to the third processing layer and a fourth processing layer coupled to the third CBAM.

In some embodiments, the processing layer includes a convolution layer, a max pooling layer, and a ReLU activation.

In some embodiments, the first processing layer has an output shape of 74×74×32.

In some embodiments, the first CBAM has an output shape of 74×74×32.

In some embodiments, the second processing layer has an output shape of 36×36×64.

In some embodiments, the second CBAM has an output shape of 36×36×64.

In some embodiments, the third processing layer has an output shape of 17×17×128.

In some embodiments, the third CBAM has an output shape of 17×17×128.

In some embodiments, the fourth processing layer has an output shape of 7×7×128.

In some embodiments, the C3BAM-Net CNN has four dense layers.

In some embodiments, the C3BAM-Net CNN further includes Gradient-weighted Class Activation Mapping (Grad-CAM).

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
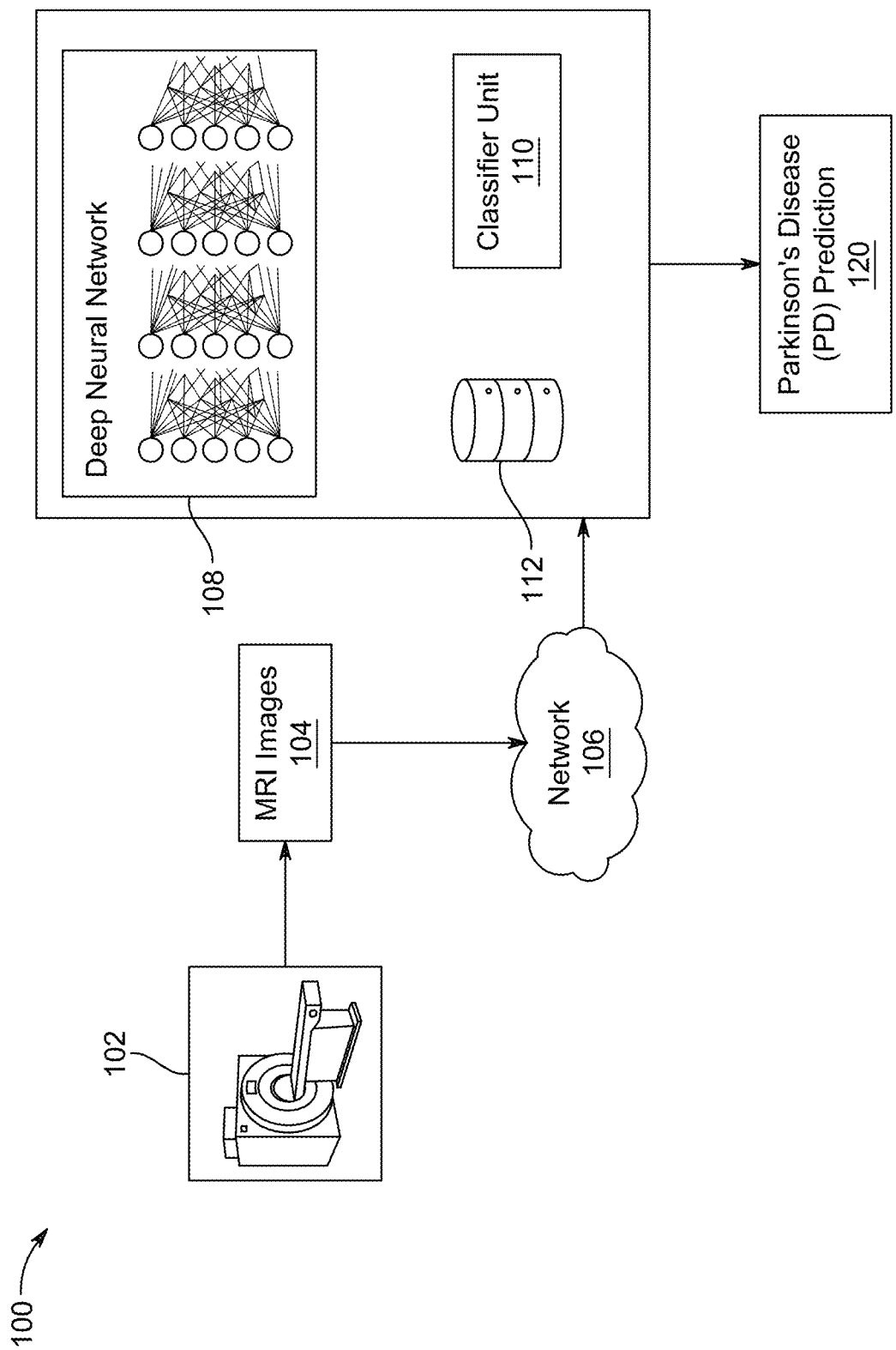
FIG. 1 is an exemplary diagram of a system configured for classifying Parkinson's Disease (PD) from a magnetic resonance imaging (MRI) data, according to certain embodiments.

In the drawings, reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

The present disclosure, a Convolutional Block Attention Module (CBAM) and an Explainable AI (XAI) (C3BAM-XAI), provides a significant advancement in a Parkinson's Disease (PD) stage classification by integrating the CBAM and the XAI techniques to enhance accuracy, efficiency, and interpretability. Conventional deep learning models, which often lack transparency and require extensive computational resources. The C3BAM-XAI model achieves 93.33% accuracy, has a lightweight design with only 1.8 million parameters, and efficient for real-world clinical applications. The CBAM architecture improves feature extraction by focusing on the most relevant regions in a magnetic resonance imaging (MRI) scan, enhancing diagnostic precision and reducing noise. Additionally, a comprises Gradient-weighted Class Activation Mapping (Grad-CAM) based explainability ensures the clinicians better the PD predictions, addressing the common issue of AI being a black box in medical applications.

The present disclosure may automate hyperparameter tuning using Nadam Optimization (NO), eliminating manual adjustments and optimizing training performance. To overcome the data imbalance challenge in medical imaging, data augmentation techniques may be implemented, ensuring better generalization across diverse patient profiles. The C3BAM-XAI is computationally efficient and scalable, reduce diagnostic errors, increase efficiency, and lowers costs for hospitals, clinics, and AI-driven healthcare platforms. The C3BAM-XAI provides a fast, accurate, and interpretable AI solution, the PD serves as a valuable decision-support tool for early detection and improving patient outcomes and advancing AI-driven medical diagnostics.

FIG. 1 is a system classifying the PD from the MRI data, according to one or more embodiments. The system 100 includes MRI device 102, processing unit 108 and a classifier unit 110.

The MRI device 102, as described herein, may be a medical imaging device that operates based on nuclear magnetic resonance principles. The MRI device 102 includes a primary superconducting magnet that generates a strong, uniform static magnetic field ($B_o$), in the range of 1.5 to 3.0 Tesla. The field generated by the magnets aligns the nuclear spins of hydrogen atoms within the body. Surrounding the magnet is a set of gradient coils arranged along three orthogonal axes (X, Y, Z), which introduce spatial variations in the magnetic field. The gradients are rapidly switched by high-power amplifiers and are important for spatial encoding of the MRI signal. Active shielding and integrated cooling mechanisms help reduce noise, heat buildup, and interference with nearby systems. An RF coil system of the MRI device 102 is used to transmit radiofrequency pulses at the Larmor frequency, temporarily disturbing the aligned spins, and to receive the emitted MR signals as the spins return to equilibrium. The MRI device 102 may include a body coil for transmission and specialized surface or phased-array coils for signal reception to enhance sensitivity and image resolution. The MRI device 102 also includes a patient table. The patient table enables precise positioning within the magnet bore, while shimming systems, both passive and active, are used to fine-tune the homogeneity of the magnetic field.

The MRI device 102 operation includes acquiring raw k-space data through coordinated radio frequency (RF) excitation and gradient encoding. The MRI device 102 reconstructs spatial-domain images by applying Fourier-transform algorithms to the acquired k-space data. An integrated software platform synchronizes hardware timing. The integrated software platform performs Fourier-based data processing, and executes advanced post-processing routines, such as parallel imaging and compressed sensing. The integrated software platform produces high-quality an MRI images 104 in a seamless, unified workflow.

The MRI device 102 integrates high-field magnet technology, rapid spatial encoding, and efficient signal processing to deliver detailed anatomical and functional images. The MRI device 102 may support a range of clinical applications. The MRI device 102 may provide high signal-to-noise performance, fast scan capabilities, and flexible imaging protocols in a single, user-configurable platform. The detailed information of the MRI device 102 is not provided herein for the sake of brevity and as it is known in the art. Also, the above components of the MRI device 102 are not shown in the figure.

The MRI device 102 generates MRI images 104. The MRI images 104 refer to digital representations of internal anatomical structures acquired through the MRI device 102. In the MRI device 102, a subject may be exposed to a strong static magnetic field, causing hydrogen nuclei (primarily in water and fat) to align. The RF pulses are then applied to perturb the alignment. The RF pulses aligned are detected and spatially encoded using magnetic field gradients. The RF pulse signals are reconstructed via Fourier transformation into two-dimensional (2D) slices or three-dimensional (3D) volumes.

In one embodiment, the MRI device 102 acquires a high-resolution MRI scan also referred to as MRI image 104 of an anatomy of a patient, using a 3T (Tesla) MRI scanner also referred to as MRI device 102, with T1-weight imaging sequences. According to the disclosure, the anatomy may be a brain of the patient. The imaging sequences provide detailed anatomical images that are used for identifying subtle structural changes that may indicate a presence or progression of the PD. The MRI images 104 may be obtained in standard formats such as Digital Imaging and Communications in Medicine (DICOM) to ensure compatibility with processing tools.

The acquired MRI images 104 are subjected to processing through a processing unit 108. In one or more embodiments, the processing unit 108 includes a hardware-software system designed to execute a neural network for the MRI applications. The processing unit 108 includes high-performance processors (e.g., graphics processing units (GPU), tensor processing units (TPU), field-programmable gate arrays (FPGA)), high-speed memory, an integrated pre-processing module, a post-processing module, a post-processing module, a control interface and a neural inference engine configured to reconstruct and enhance images from MRI data. The integrated pre-processing module converts the raw k-space data into the neural network-compatible formats. The neural network enhances the quality and consistency of the data. The post-processing module refines outputs for clinical use. The control interface manages data flow and system integration. The processing unit 108 supports real-time operation, secure updates, and compliance with medical imaging standards.

In an example, the processing unit 108 is configured to receive, interpret, and execute instructions or data. The processing unit 108 may include one or more processors and/or cores capable of performing arithmetic, logical, control, and input/output operations. The processing unit 108 enables the processing and manipulation of digital information within an electronic device or system.

In the disclosure, the processing unit 108 is configured to receive the MRI images 104 through a network 106. The network 106 may include wired or wireless local-area networks (LANs), wide-area networks (WANs), virtual private networks (VPNs), cellular systems, Ethernet, Wi-Fi, fiber-optic connections, or combinations thereof. The MRI images 104 are transferred from storage systems over the network 106 to the processing unit 108. The network 106 enables centralized or distributed Artificial Intelligence (AI)-based analysis of the PD from the brain using the MRI images 104.

In some implementations, the processing unit 108 may receive MRI images 104 directly from the MRI device 102 itself at the time of report generation. Here, the MRI device 102 transmits raw or reconstructed MRI images 104 immediately following acquisition, bypassing intermediate network storage. The direct interface enables near real-time or real-time analysis of MRI images 104 as soon as the scan completes, reducing latency and expediting diagnostic processing.

In some embodiments, contemplates embedding the processing unit 108 within the MRI device 102. In the configuration, the processing unit 108 based feature extraction and classifier unit 110 are implemented in hardware or software directly on the MRI device 102 using onboard CPUs, GPUs, ASICs, or FPGA accelerators. Once the MRI images 104 are acquired and reconstructed, the MRI device 102 executes the PD detection algorithm locally. Results such as probability scores, processed images, or diagnostic annotations are then made immediately available on the MRI console or transmitted to a connected clinical system.

The processing unit 108 is operatively coupled to the classifier unit 110. The classifier unit 110 refers to a hardware or software component configured to assign categories or labels to input data based on predefined rules or learned models, including but not limited to machine learning algorithms. The processing unit 108 is configured to receive the MRI image 104 and extract multi-dimensional feature representations via the neural network-based feature extractor. The multi-dimensional features are communicated to the classifier unit 110.

In the disclosure, the classifier unit 110 is configured to process the received multi-dimensional features using domain-specific normalization (unique characteristics of MRI 104), attention mechanisms, and task-adapted layers to generate diagnostic outputs. The attention mechanism is a computational technique integrated into neural network architectures to selectively weight input features or intermediate representations. The attention mechanism enhances the ability to focus on the most informative components of the data for a given task. The classifier unit 110 may operate as a modular component within a processing sequence. The processing sequence receives data directly from the processing unit 108, and outputting class predictions, probability maps, and/or segmentation masks relevant to clinical interpretation. The integration of the processing unit 108 and classifier unit 110 enables automated analysis of MRI images 104, improving diagnostic efficiency and accuracy across various neuroimaging tasks. The classifier unit 110 is optimized using medical imaging-specific loss functions. The medical imaging-specific loss functions may be designed to optimize the classifier unit 110 performance for medical imaging tasks by addressing domain-specific challenges like class imbalance or anatomical accuracy. The classifier unit 110 supports applications such as brain tumor classification, Alzheimer's detection, the PD detection and lesion segmentation, offering improved performance over generic classifiers due to the MRI-specific design.

In operations, a patient may be diagnosed through a clinical and/or diagnostic process. Initially, a physician may obtain a medical history and current symptoms. The current symptoms may include bradykinesia (slowness of movement), resting tremors, muscle rigidity, and/or postural instability, along with peripheral symptoms such as non-motor signs like sleep disturbances, constipation, or anosmia. A neurological examination may be conducted to assess motor function and exclude alternative conditions. Diagnosis may be primarily clinical and guided by criteria such as the UK Parkinson's Disease Society Brain Bank or MDS Clinical Diagnostic Criteria, indicating the presence of bradykinesia along with either tremor or rigidity. A levodopa challenge test (clinical test used to assess a patient's responsiveness to levodopa) may be performed to observe symptom improvement, supporting the diagnosis. To strengthen or clarify the clinical impression, a DaTscan (dopamine transporter SPECT imaging) may often be used to assess dopamine activity in the brain, reduced uptake is consistent with the PD. The MRI imaging is performed to rule out structural brain abnormalities, and laboratory tests (e.g., thyroid function, B12 levels) are used to exclude other causes of parkinsonism. Genetic testing may be considered in young-onset or familial cases. Longitudinal follow-up over time is important to monitor symptom progression and confirm diagnostic accuracy.

In one or more embodiment, a method and system for assisting in the PD prediction 120 using the MRI in combination with a neural network-based analysis. FIG. 1 involves positioning the patient in the MRI device 102, to acquire high-resolution images from the brain of the patient, and collecting data using standard imaging sequences including, but not limited to, T1-weighted, T2-weighted, susceptibility-weighted imaging (SWI), and diffusion tensor imaging (DTI). The scans or the MRI images 104 are acquired from the MRI device 102.

In one or more embodiments, processing unit 108 is configured to receive the MRI images 104 from the MRI device 102 over the network 106 that aggregates scan data from, for example, hospital systems. For example, MRI scan data, also referred to as the MRI images 104, may reside on a centralized server within a single hospital or across multiple hospitals, interconnected via one or more communication networks.

The processing unit 108 performs preprocessing on the acquired MRI images 104 to enhance the quality and consistency of the image data. In an example, preprocessing steps include noise reduction using Gaussian filters or similar techniques to minimize artifacts, normalization of intensity values across the scans to a common range, and registration of images to a standard brain template to ensure consistency in anatomical orientation. Additionally, the processing unit 108 may use segmentation techniques to isolate regions of interest (ROIs), such as the substantia nigra, which may be affected by the PD. The preprocessing steps may reduce variability in the image data such that the image data has consistent and high-quality input.

The processing unit 108 processes the MRI images 104 through a Convolutional Block Attention Modules Net convolutional neural network (C3BAM-Net CNN) architecture such as an architecture to obtain a plurality of attention-enhanced feature maps. The C3BAM-Net CNN architecture is discussed in detail in FIG. 5. The CNN is a type of deep learning architecture specifically designed to process data with a spatial or grid-like structure, such as digital images, and is effective in the analysis of medical imaging data, including the MRI scans. The C3BAM-Net CNN architecture includes a sequential arrangement of layers. The sequential arrangement of layers are convolutional layers, a Rectified Linear Unit (ReLU) activation functions, a max-pooling layer, a flattened layer and a dense layer, which function to automatically extract and learn hierarchical spatial and contextual features from high-dimensional input data.

The CBAM is a lightweight attention mechanism for convolutional neural networks which sequentially applies channel and spatial attention to enhance feature representation. The CBAM improving model performance with minimal computational cost The convolutional layer is the neural network component configured to learn spatial hierarchies of features from input data also referred to as input layer by applying a plurality of learnable filters to the input. The convolutional layer of each filter is convolved across the input data to compute a plurality of dot products over localized regions. The convolutional layer generates one or more feature maps that represent extracted patterns or features.

The ReLU activation layer is the neural network component configured to apply a non-linear activation function that outputs the input value if it is greater than zero and outputs zero if the input value is less than or equal to zero.

The max-pooling layer is the neural network component configured to down sample input data by partitioning the input into non-overlapping or overlapping regions and outputting, for each region, the maximum value. The max pooling layer reduces spatial dimensions while preserving prominent features.

The flattened layer is the neural network component configured to convert a multi-dimensional input tensor into a one-dimensional vector by sequentially arranging the values contained in the input. The flattened layer enabling compatibility with fully connected layers or classification modules.

The dense layer is the neural network component configured to compute an output vector by performing a weighted sum of all input values using a plurality of learnable weights.

The convolutional layers apply a set of trainable filters (kernels) through localized convolution operations to detect features such as anatomical structures, tissue textures, and pathological patterns present in the MRI images 104. The CNN operations are followed by activation functions like the ReLU, which introduce non-linearity and enhance the ability of the model to capture complex signal variations and contrast differentials inherent in the MRI data.

Pooling layers, such as max pooling, down sample the spatial dimensions of feature maps, reducing computational complexity and overfitting while preserving salient diagnostic information. The output feature representations are flattened and passed through one or more fully connected layers that aggregate global information and generate final outputs. The final outputs may be classification of abnormalities, segmentation of anatomical regions, or lesion detection. The C3BAM-Net CNN is trained using supervised learning with the MRI labeled datasets, employing backpropagation and gradient descent to iteratively minimize a predefined loss function. The C3BAM-Net CNN architecture enables automated, accurate interpretation of the MRI data and supports enhanced diagnostic performance and efficiency in clinical and research applications.

In one embodiment, the CBAM refers to a neural network module configured to refine feature maps by applying sequential channel and spatial attention. The CBAM enhancing task-relevant information in convolutional architectures.

The CBAM may be integrated into the CNN to enhance feature representation by selectively emphasizing informative features while suppressing less relevant ones. The CBAM operates by applying attention mechanisms in two sequential stages: a channel attention module (CAM) followed by a spatial attention module (SAM). The CAM emphasizes what feature maps are significant by learning to assign weights to each channel, using global average and max pooling followed by a shared multilayer perceptron (MLP). The identified significant feature map may be applied to the input feature map via element-wise multiplication. The SAM determines areas of focus by applying pooling across the channel dimension, then using a convolution layer to generate a spatial attention map. The spatial attention map may be accomplished by aggregating a channel-refined feature maps across channel axis using average pooling and max pooling, concatenating the results, and applying a convolution operation to generate the spatial attention map. The spatial attention may be applied via element-wise multiplication. A combined effect of the CAM and the SAM permits the network to adaptively focus on both what and where to attend in each feature representation. In aspects, the CBAM is lightweight in design, introduces minimal computational overhead, and may be applied to a variety of CNN architectures, including but not limited to ResNet, DenseNet, and MobileNet. The detailed disclosures of the CAM and the SAM are discussed in FIG. 3 and FIG. 4.

In one or more embodiments, the imaging data can be input into a trained the CNN of the processing unit 108 which was developed using labeled datasets having the MRI scans from the PD patients and healthy people. The neural network extracts spatial and anatomical features such as changes in tissue contrast, structural asymmetries, or iron accumulation and predicts the likelihood of the PD based on learned patterns. The prediction may be binary (the PD vs. non-PD) or probabilistic and may be enhanced with explainable AI techniques like Grad-CAM, which visually highlights brain regions contributing to the decision of the model. When integrated with clinical information such as levodopa response, symptom severity scores, or DaTscan results, the AI-assisted MRI analysis significantly improves diagnostic sensitivity and specificity. The combination of MRI imaging and neural network interpretation provides a non-invasive, efficient, and scalable approach that supports clinicians in the early and accurate the PD prediction 120.

The C3BAM-Net CNN processes the MRI images 104 through a series of convolution layers configured to extract and learn relevant features. The structure of the CNN is inspired by the human visual cortex and is designed to emulate the pattern recognition capabilities of the human brain. The C3BAM-Net CNN starts by taking the MRI images 104 as input the 2D slice or the 3D volume and feeds it into convolutional layers. Each layer applies small, trainable filters (kernels) that slide over the image, detecting features like edges or textures. The sliding window approach, with shared weights, allows the network to learn repeating patterns across different regions.

Activation functions, most commonly the ReLU, may be applied following each convolutional layer. By transforming negative values to zero and retaining positive values, the ReLU injects non-linearity into the network and permits recognition of complex patterns instead of restricting the CNN model to handling only simple linear combinations.

In addition, pooling layers (e.g., max pooling) reduce the spatial resolution of feature maps. Making the representation more compact, improves computational efficiency, and helps focus on critical features while tolerating small shifts in the image.

Once several rounds of convolution, activation, and pooling are performed, the resulting feature maps are flattened into a single vector. Fully connected layers take over combining the learned features to produce probabilistic outputs, using a sigmoid or SoftMax activation depending on whether it's binary or multiclass classification.

During training, the CNN learns by comparing its output to known labels using a loss function (like cross-entropy). Optimization algorithms are used to minimize the error through back-propagation. The iterative process continues until the C3BAM-Net CNN network accurately distinguishes between the MRI images 104 of patients with the PD and healthy people.

The CBAM integrates seamlessly into CNN architecture, C3BAM Net-CNN, to enhance feature maps by applying two attention steps in sequence, one evaluating channel-wise importance and another that highlights spatial significance.

During a channel attention phase, each feature channel is assessed to determine the C3BAM Net-CNN relevance. The process starts by summarizing activation patterns across spatial dimensions, by taking average and maximum values. The summaries are communicated through a shared compact neural subnetwork, which learns to assign a weight to each channel. Multiplying these learned channel weights with the original feature maps amplifies useful channels and suppresses less meaningful ones.

In a spatial attention phase, attention shifts to identifying critical spatial locations within the refined feature maps. Activations are pooled across the channel dimension again through both average and maximum operations to form spatial descriptors. A convolutional layer processes the descriptors and outputs spatial weights via an activation function. Applying the weights refines focus on regions within the image that contribute most to the task at hand.

By executing channel attention first, the module filters feature channels holistically. Additionally, spatial attention refines localization within the selected channels. A two-step process is used to determine what the network pays attention to (channels) and where (spatial regions) and are jointly optimized. Designed to be lightweight, CBAM adds minimal computational overhead and fully supports end-to-end training. The CBAM can be inserted into any layer of the CNN, enhancing representational strength without disrupting the overall architecture.

A significant limitation of conventional models was the presence of an imbalanced training dataset, which frequently resulted in overfitting and poor performance on new examples. To overcome the conventional issues, the present disclosure includes a data augmentation, diversifying the training set and reducing the model's inclination to learn spurious correlations or bias toward dominant patterns. The output of the data augmentation is sent to C3BAM Net-CNN.

The classifier unit 110 receives C3BAM Net-CNN for the PD prediction 120, processes the features extracted by earlier layers to make diagnostic predictions. During training, the classifier unit 110 utilizes a loss function, such as binary cross-entropy for binary classification tasks, to measure the discrepancy between predicted and actual labels. Optimization algorithms like Adam or stochastic gradient descent adjust the network's weights to minimize the loss, enhancing the model's accuracy. Regularization techniques, including dropout or L2 regularization, may be applied within the classifier unit 110 to prevent overfitting and improve generalization.

Upon completion of training, the classifier unit 110 outputs a probability score for each input MRI images 104. The probability score can be thresholded to make a definitive classification decision on the PD prediction 120. The classifier unit 110 output assists clinicians in diagnosing the PD prediction 120 based on the MRI images 104. The system 100 includes one or more data storage devices or the database 112.

Figure 2:
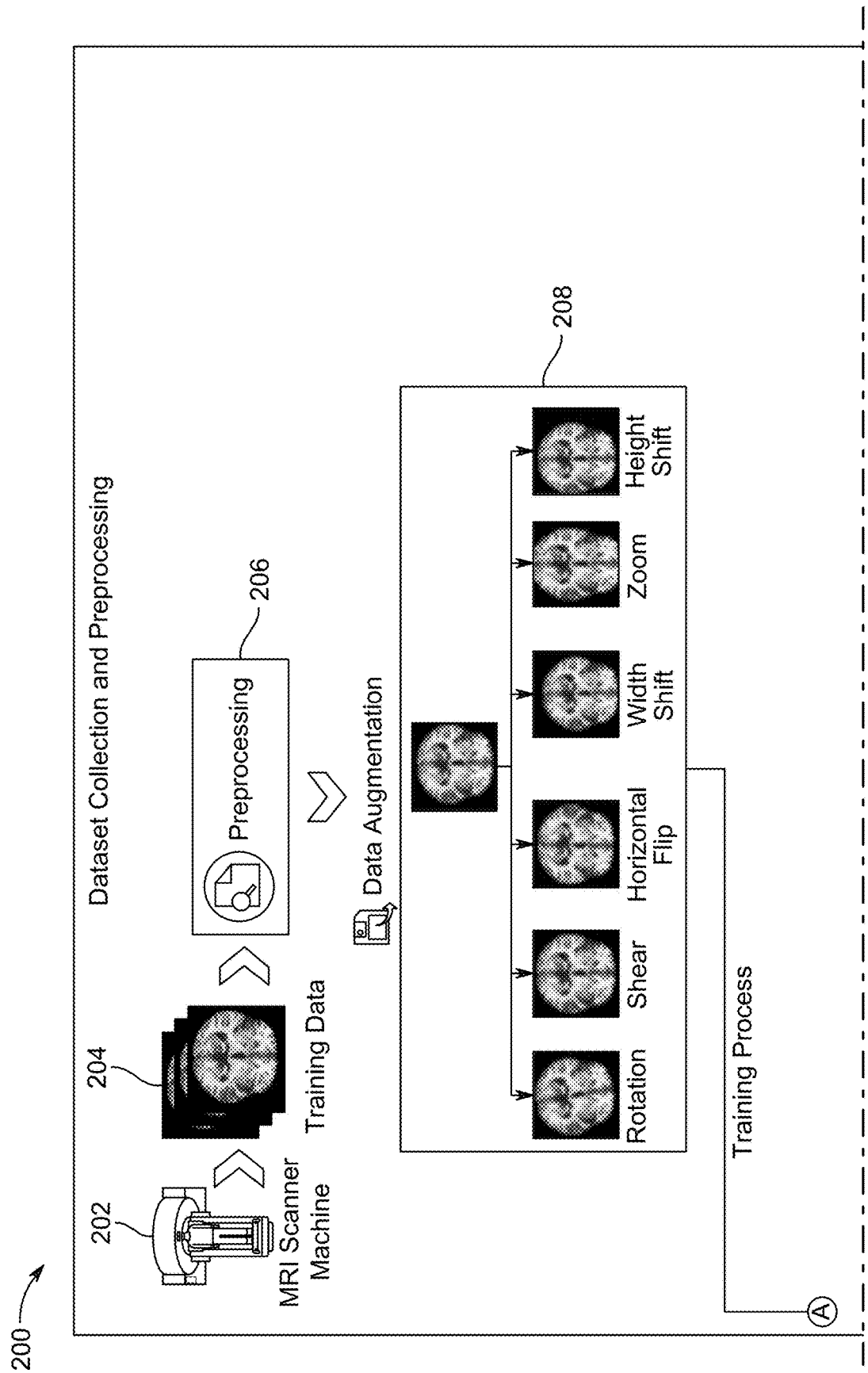
FIG. 2 is an exemplary diagram of a Convolutional Block Attention Module and Explainable AI architecture (C3BAM-XAI) for the PD prediction from the MRI data, according to certain embodiments.
Figure 2:
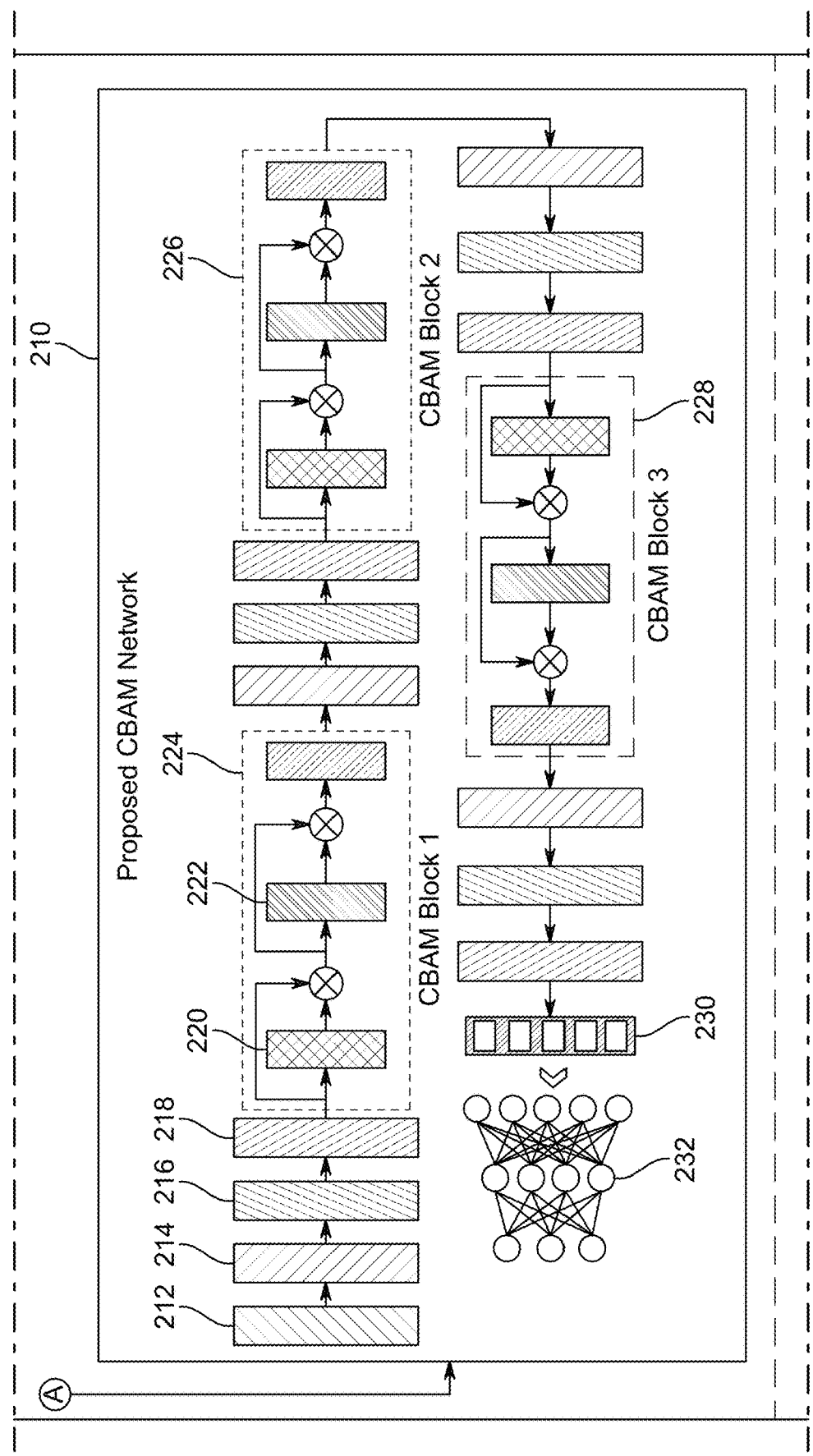
Figure 2:
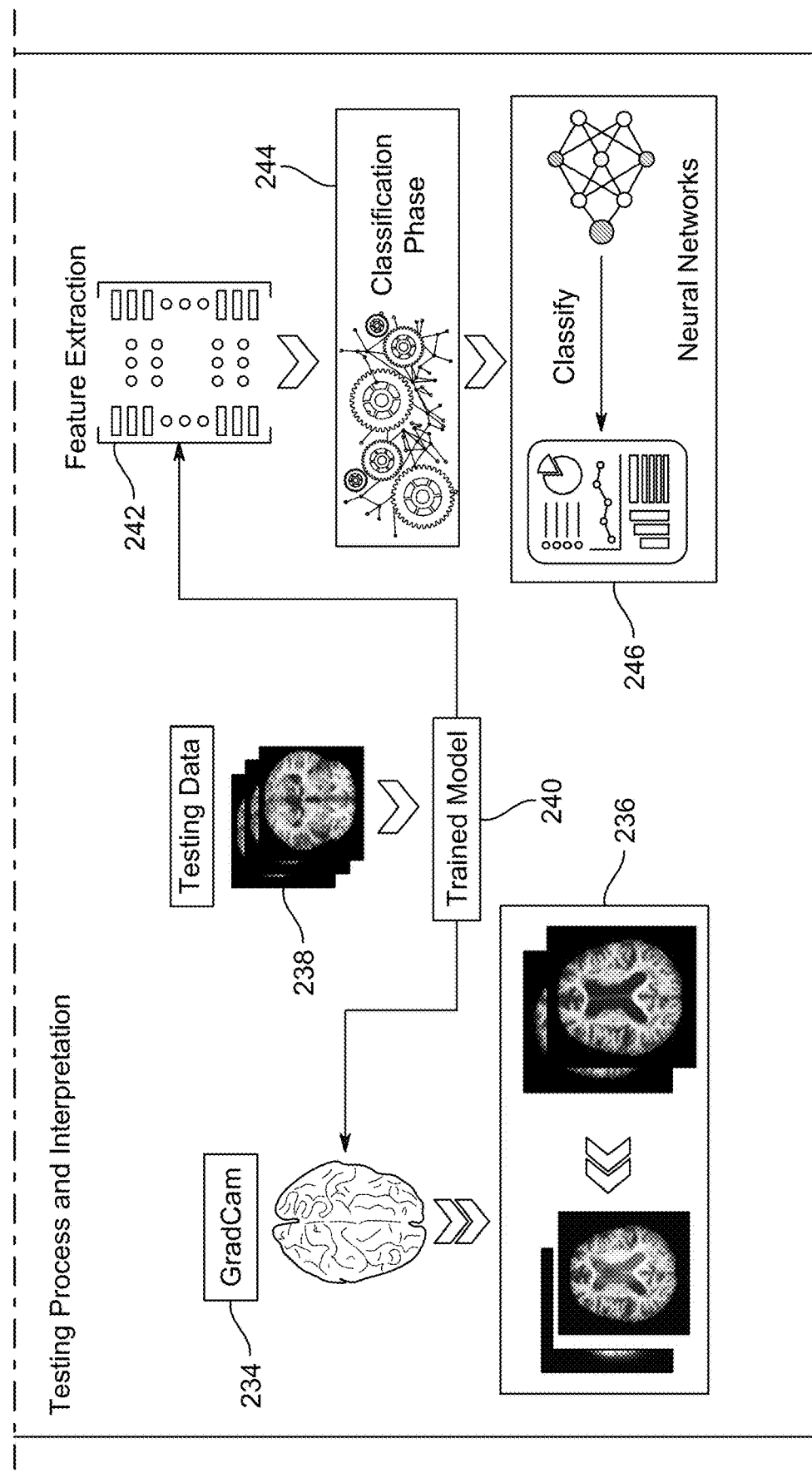

The C3BAM XAI architecture for the PD prediction 120 from the MRI images 104 is disclosed in FIG. 2. FIG. 2 shows the detailed C3BAM XAI 200 architecture consisting of an important middle step, including dataset augmentation, model design based on the C3BAM-Net CNN, model training, model testing, and interpretation.

The AI refers to the simulation of human cognitive functions by machines, which includes computer systems, encompassing capabilities such as learning, reasoning, and problem-solving. The CNNs are a class of deep learning models specifically designed to process data with a grid-like topology, such as images, by applying convolutional filters to automatically and adaptively learn spatial hierarchies of features. The XAI includes a set of techniques and methodologies designed to render the decision-making processes of AI models, particularly complex architectures such as CNNs, transparent and comprehensible to human users. In the disclosed the C3BAM-XAI 200 architecture, the XAI functionality is integrated to facilitate user interpretation of the model's predictive behavior. Interpretability holds significant value in domains such as healthcare and finance, where trust, accountability, and regulatory compliance are paramount. The C3BAM-XAI 200 architecture incorporates components including, but not limited to, attention mechanisms, saliency mapping, and gradient-based visualization tools, which collectively identify and highlight the most influential input features contributing to a given output. The mechanisms enable traceability reasoning of the model, supporting validation, bias detection, and reliability enhancement. By unifying computational efficiency with interpretability, the C3BAM-XAI 200 architecture addresses both performance and ethical considerations associated with real-world AI deployment.

Initially, MRI data also referred to as the MRI images 104 are acquired from clinical and/or the MRI device 202. The acquired MRI data 104 is then processed to form a training dataset 204, tools annotate regions of interest (ROIs), such as tumors or anatomical structures. The training dataset 204 includes MRI examinations of few individuals suffering from the PD and few not suffering from the PD.

Training of the data is performed by the processing unit 108, which is configured to adjust model parameters based on input data. The training datasets 204 undergo a preprocessing phase 206 involving intensity normalization to reduce scanner-specific variability, spatial resampling to a uniform voxel size, and image registration to a standard anatomical template. In some examples, steps such as the ROI-based cropping or padding may be used to match model input dimensions and noise reduction using filtering techniques.

The training dataset 204 may be partitioned into two subsets. The trained datasets and testing datasets are used in a ratio, for example, 70:30, 80:20, and/or 85:15. After the partitioning, data augmentation 208 techniques were applied to the training subset. The data augmentation 208 is a technique used to artificially expand the size and diversity of the MRI training datasets 204. Following the preprocessing phase 206, the training subset data is subjected to the data augmentation 208 to enhance model generalizability. The data augmentation 208 generates a balanced training dataset 204 by applying geometric and photometric transformations to MRI scans. The geometric and the photometric transformations include rotation, scaling, horizontal and vertical flipping, and intensity shifting. The data augmentation 208 is selectively applied to underrepresent the PD stages to mitigate class imbalance and enhance the model ability to generalize across anatomical variances. The operations both increase the volume of the training dataset 204 and simulate real-world positional, orientational, and contrast variations, thereby improving robustness.

Following the data augmentation 208, the configuration uses or generates a custom the C3BAM-Net CNN 210 architecture for feature extraction 242 in medical imaging contexts. Central to the C3BAM-Net CNN 210 architecture is the integration of a CBAM module. The CBAM module includes a CBAM block 1 224, a CBAM block 2 226 and a CBAM block 3 228. The CBAM module, a dual-stage attention mechanism that enables the network to emphasize diagnostically relevant features. The CBAM module sequentially applies to the CAM and the SAM mechanisms. For example, the CBAM block 1 224 includes the CAM 220 and the SAM 222. The CAM mechanism refines the feature maps by weighing their significance across different channels. The mechanism localizes the most informative spatial regions. The configuration improves the network's discriminative ability and allows to concentrate on the most pertinent regions of the brain MRI scans during both training dataset 204 and inference.

The disclosed pertains to a deep learning architecture includes a plurality of hidden layers, including but not limited to input layer, the convolutional layers, the ReLU activation functions, batch normalization layers, the max pooling layers. The CBAM includes the CAM and the SAM, flattening layers, and fully connected layers. The architecture may include a total of sixteen (16) layers.

In one embodiment, the C3BAM-Net CNN 210 configured to receive an input also referred to as input layer 212 of dimensionality 150×150×3 (height×width×depth). The C3BAM-Net CNN 210 architecture includes, for example, four (4) convolutional layers, each followed by the ReLU activation function 216 and a max pooling layer 218. In an embodiment, the first convolutional layer 214 is configured with a depth of thirty-two (32) filters, each having a kernel size of 3×3, a stride of one (1), and is followed by the ReLU activation function 216. The detailed explanation of C3BAM-Net CNN 210 architecture is explained in FIG. 5

Post the initial the convolutional layer 214 and the ReLU activation layers 216, the CBAM block 1 224 is integrated into the architecture. The CBAM block 1 224 includes the CAM 220 and the SAM 222, which collectively enhance the network's ability to focus on the most relevant spatial and channel-wise features. The CBAM block 1 224, emphasizes the brain regions that are clinically significant in the context of the PD, such as the substantia nigra and basal ganglia, which are known to be predominantly affected. The detailed discussion of the CAM and the SAM is discussed in FIG. 3 and FIG. 4.

The CBAM block 1 224, the CBAM block 2 226 and the CBAM block 3 228, serves to improve the signal-to-noise ratio by attenuating irrelevant features. The CBAM block 1 224, the CBAM block 2 226 and the CBAM block 3 228 enhances the extraction of clinically meaningful patterns for the PD prediction 120. The patterns may correspond to subtle anatomical changes associated with the PD. Furthermore, the CBAM block 1 224, the CBAM block 2 226 and the CBAM block 3 228 is computationally lightweight, thereby maintaining the overall efficiency of the convolutional neural network without imposing a significant computational burden.

Figure 5:
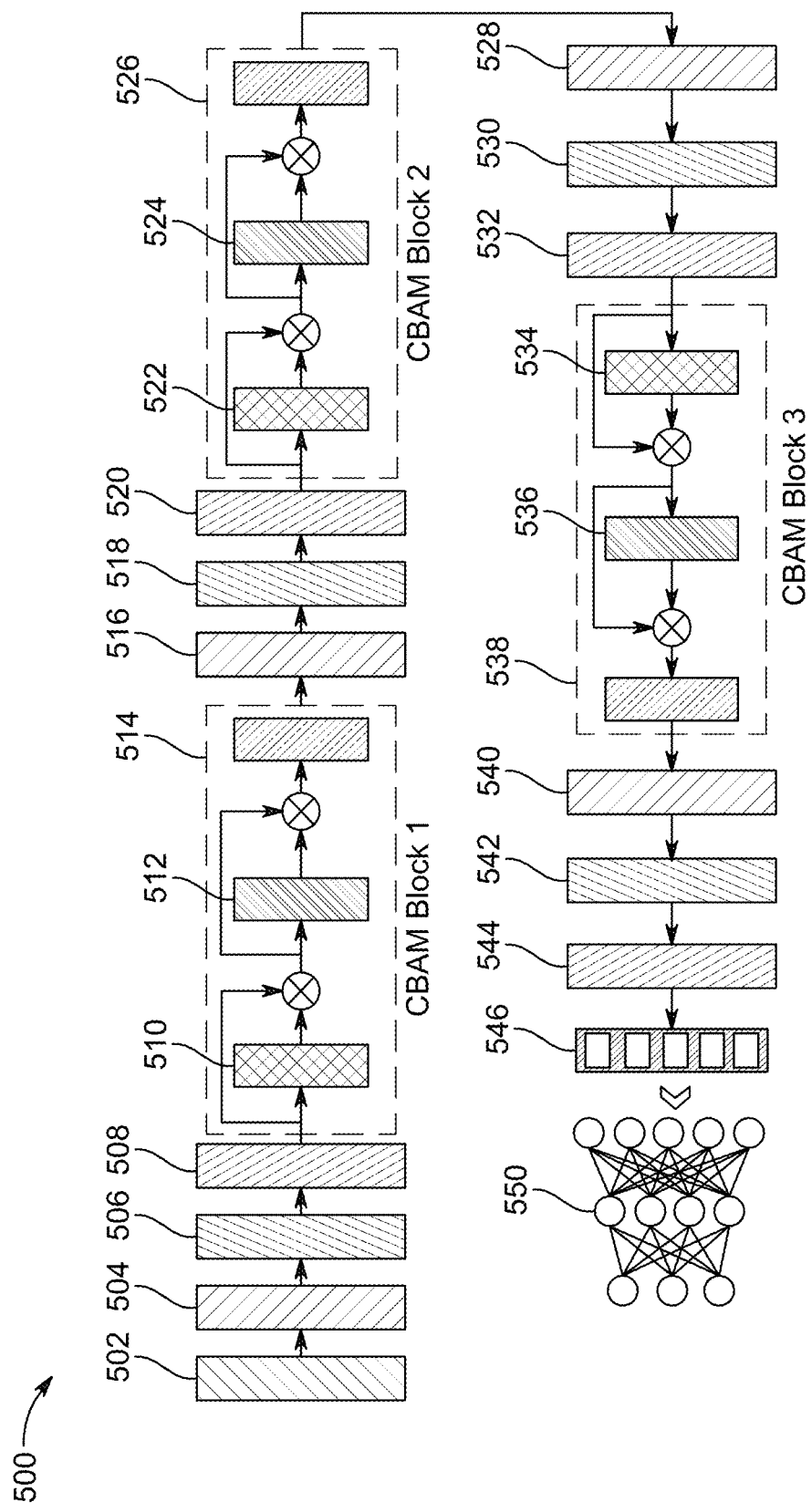
FIG. 5 is an exemplary diagram of the C3BAM-Net architecture for PD classification using MRI data in detail, according to certain embodiments.
Figure 6:
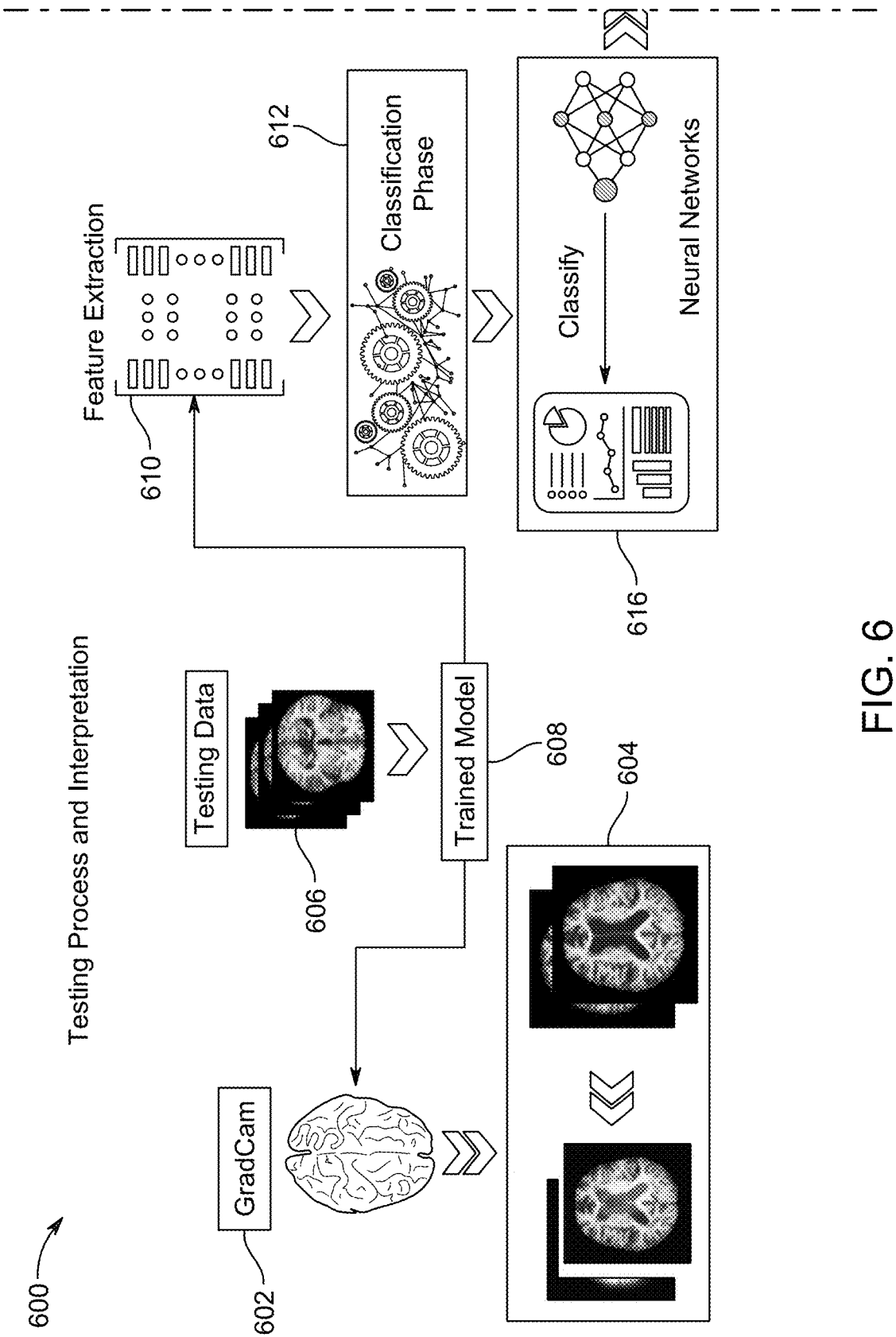
FIG. 6 is a visual illustration of proposed testing process for the PD classification using the MRI data.
Figure 6:
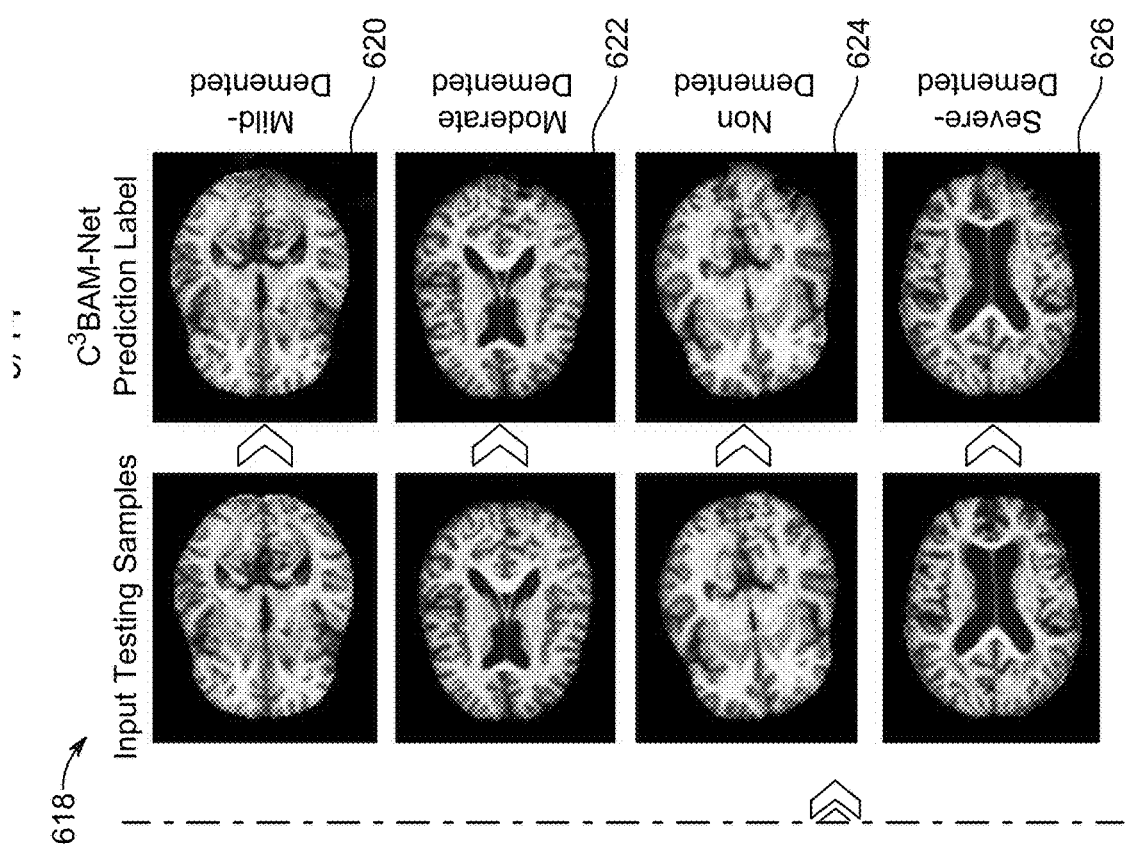

During the training process, the C3BAM-Net CNN 210 architecture is optimized using Nadam optimization algorithm. The Nadam is an optimization algorithm that merges Adam with Nesterov momentum for faster, more stable convergence. The Nadam optimization algorithms a variant of an Adam that incorporates Nesterov momentum for accelerated convergence. The Adam is an optimizer that adapts learning rates using first and second moment estimates of gradients. The Nesterov is a momentum-based optimization method that improves gradient descent by computing gradients at predicted future positions. Hyperparameters such as learning rate, batch size, and regularization parameters are empirically selected to achieve optimal performance on the augmented dataset. The training process allows the C3BAM-Net CNN 210 architecture to learn from the enhanced data and develop a mapping from input MRI scans to correspond to the PD classification outputs. The proposed the C3BAM-Net CNN 210 architecture for the PD classification using the MRI data 104 is discussed in detail in FIG. 5. Upon completion of training dataset 204, the C3BAM-Net CNN 210 architecture enters a testing phase, during which features extracted 242 are processed through a set of classifiers to evaluate prediction performance and generalization. Detailed discussion of the testing process and interpretation is shown in FIG. 6.

To facilitate clinical interpretability and to comply with the demands of medical transparency, the system incorporates the XAI component in the form of the Grad-CAM 234. The configuration generates visual heatmaps 236 that indicate the areas of the input images contributing most to the model's decision-making. By overlaying an attention map with the C3BAM-Net CNN 210 architecture-enhanced feature activations, the configuration produces highly informative visual explanations. The explanations not only increase trustworthiness among healthcare professionals but also serve as critical tools for validating the diagnostic model focus, offering insights into the spatial features that drive classification decisions.

Accordingly, the architecture 200 described represents a significant advancement in the AI-based neuroimaging analysis for the PD. The architecture 200 seamlessly integrates the data augmentation 208, attention-driven deep learning, and explainability to deliver accurate, transparent, and clinically meaningful predictions.

Figure 3:
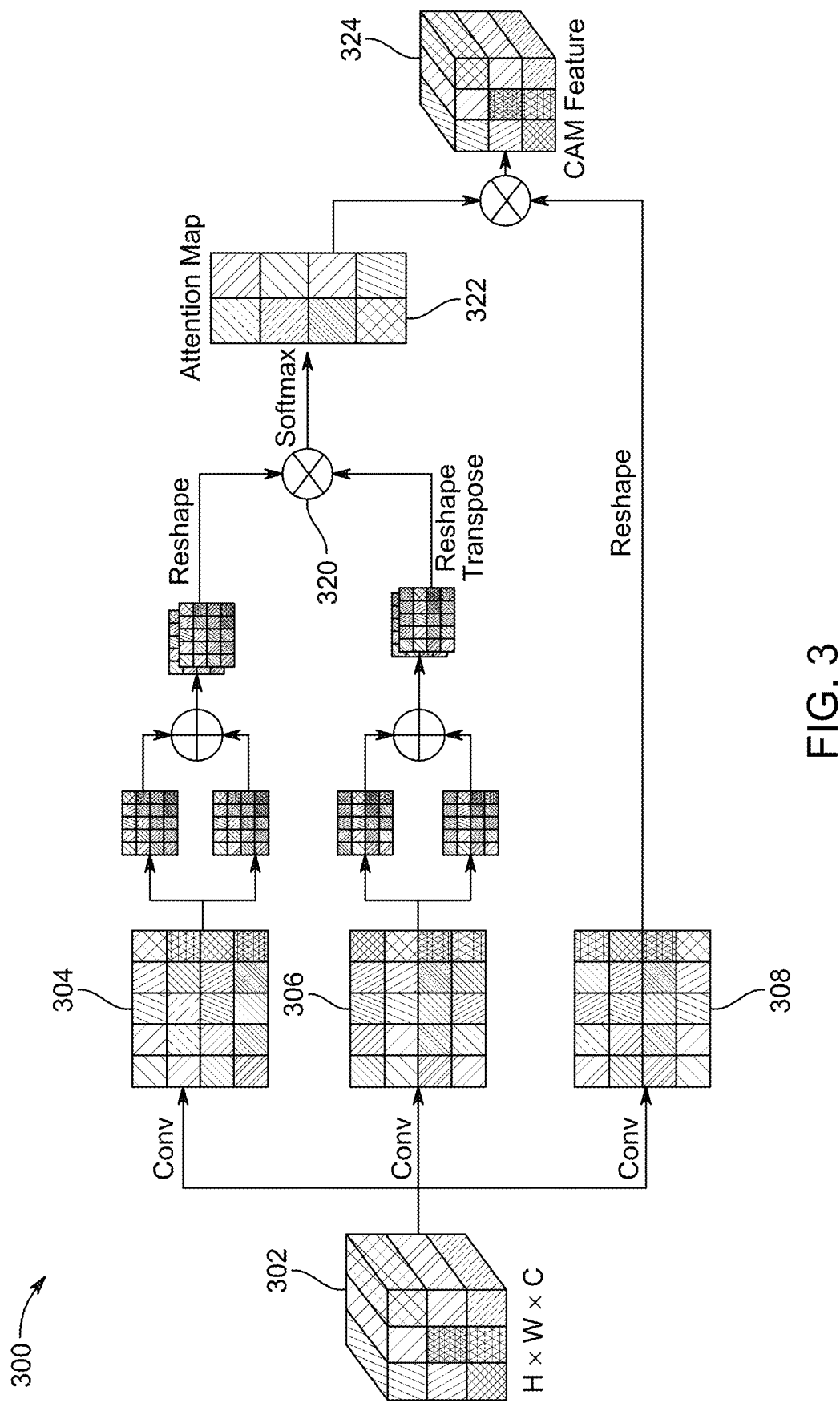
FIG. 3 is a visual illustration of Channel Attention Module (CAM), according to certain embodiments.

FIG. 3 shows visual illustration of the CAM 300, also referred to as the CAM 220. The disclosed CAM 300 pertains to a way of enhancing the interpretability and performance of the CNNs through the generation of a CAM feature 324 using an attention-based mechanism. The CAM 300 begins with the reception of an input tensor 302 having three dimensions height (H), width (W), and channel depth (C) (H×W×C) which collectively represent the spatial and feature characteristics of the input data, such as the MRI image 104.

The input tensor 302 is processed through a series of convolutional layers 304,306,308. The convolutional layers 304,306,308 each designed to extract different aspects of the input features. The convolutional layers 304,306,308 produce multiple feature maps, which are then individually reshaped and transposed to align their dimensions for further processing. The reshaping and transposition steps are important for enabling meaningful interactions between the feature maps in subsequent operations.

Following the transformations, selected feature maps are combined using element-wise addition. The operation integrates complementary information from different feature representations, forming a unified intermediate tensor. The intermediate tensor is then passed through a SoftMax activation function 320. The SoftMax activation function 320, normalizes the values across the tensor to produce an attention map 322. The attention map 322 effectively highlights the most relevant regions and/or channels within the feature space, based on their contribution to the network's output.

To generate the final the CAM feature 324, the attention map 322 is applied to one or more of the original or intermediate feature maps via element-wise multiplication. This step selectively amplifies the features that are most influential in the network's decision-making process, while suppressing less relevant information. The resulting the CAM feature 324 provides a spatially aware representation that can be used to interpret which parts of the input data were most critical for the model's prediction.

The CAM 300 is visually shown in FIG. 3. The CAM 300 focuses on the most important feature channels. The CAM 300 uses a global average pooling layer and a global max pooling layer to derive channel-wise attention weights.

The global average pooling layer is the neural network component configured to reduce the spatial dimensions of an input feature map by computing the average of all values across each feature channel. The global average pooling layer produces a single scalar value per channel for use in subsequent classification or regression tasks.

The global max pooling layer is the network component configured to reduce the spatial dimensions of an input feature map by selecting the maximum value across all positions within each feature channel. The global max pooling layer produces a single scalar value per channel for downstream processing.

The attention for every single channel is calculated as shown in equation (1)

$$M_c(F) = \sigma(W_2(\text{ReLU}(W_1(\text{AvgPool}(F))))) + \sigma(W_2(\text{ReLU}(W_1(\text{MaxPool}(F)))))  \quad (1)$$

Where:
W1 and W2=weight matrices of the shared multilayer perceptron (MLP)
σ=the sigmoid function
F=the input feature map The CAM 300, as illustrated in FIG. 3, offers a robust and efficient mechanism for improving both the accuracy and transparency of CNN-based models, particularly in applications such as image classification, object detection, and medical imaging analysis.

Figure 4:
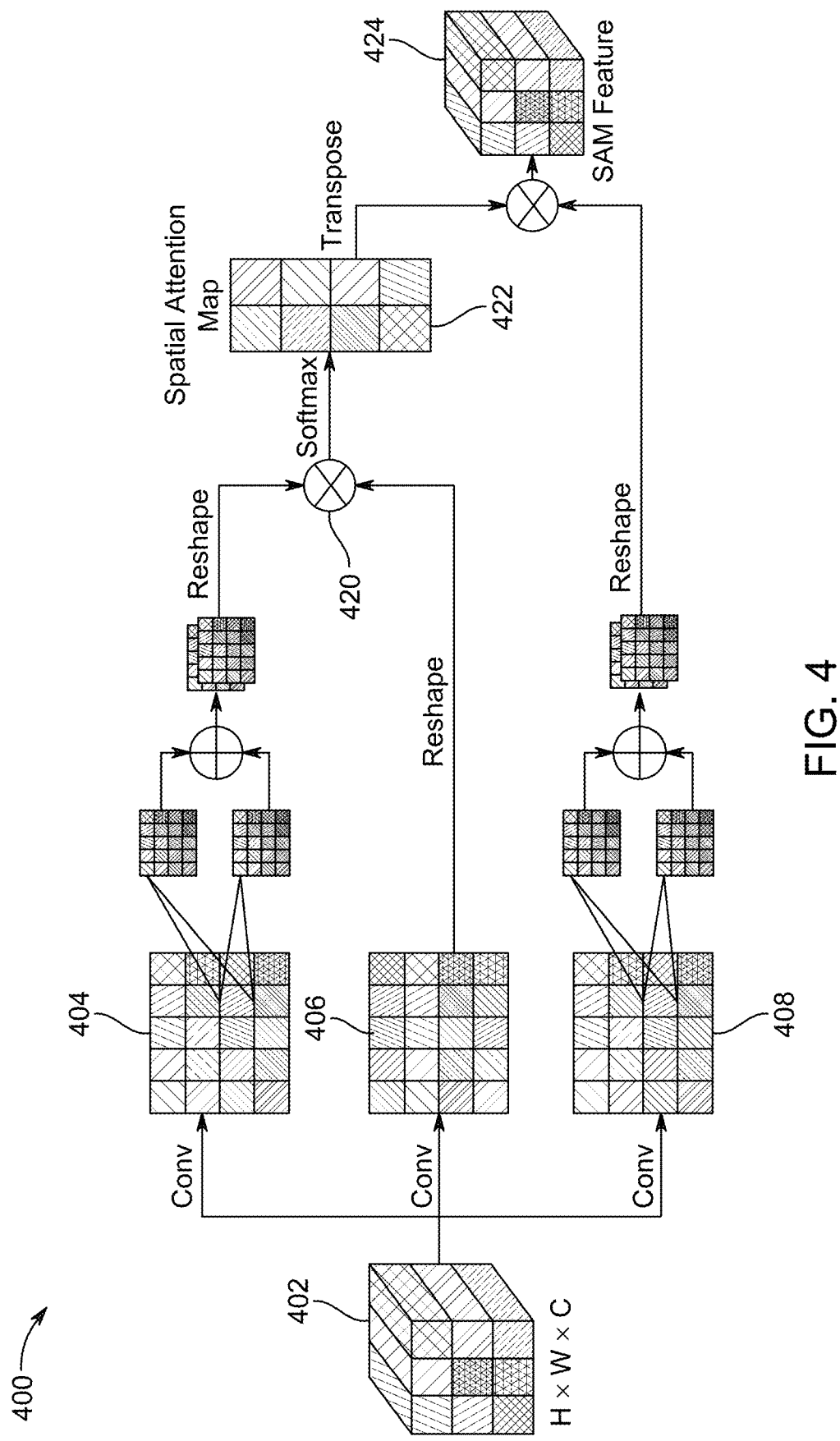
FIG. 4 is a visual illustration of Spatial Attention Module (SAM), according to certain embodiments.

FIG. 4 describes the SAM 400 that enhances spatial feature representation by integrating the SAM. The SAM 400 is used for computer vision applications where understanding the spatial context of features is important. The SAM 400 allows the network to dynamically focus on the most informative regions of an input image, which improves the accuracy and efficiency of downstream tasks such as classification, detection, and segmentation.

The process begins with an input tensor 402 characterized by 3D (H×W×C). The input tensor 402 simultaneously passed through three distinct convolutional layers 404, 406, 408. Each convolutional layer is configured to extract a different set of features, enabling the network to capture a broad spectrum of spatial and semantic information. The layers operate in parallel, ensuring that the extracted features retain their spatial alignment with the original input.

After convolution, the resulting feature maps are reshaped to facilitate compatibility for subsequent operations. The reshaping aligns the dimensions of the feature maps, allowing for element-wise operations that combine information across different spatial locations. The reshaped outputs are then subjected to element-wise multiplication, a process that models the interactions between spatial features and enhances the network's ability to capture complex patterns.

A key component of the SAM 400 is the generation of a spatial attention map 422. One of the reshaped feature maps is processed through a SoftMax activation function 420, which normalizes the values across spatial dimensions. The operation produces a probabilistic map that highlights the most relevant spatial regions in the input. The spatial attention map 422 is then transposed to match the spatial configuration of the original input tensor 402, ensuring proper alignment for the next stage.

The spatial attention map 422 is used to refine the original input tensor 402 through element-wise multiplication. The operation selectively amplifies features in regions identified as important by the attention mechanism, while suppressing less relevant areas. The result is a refined feature representation, referred to as a SAM Feature 424. The SAM Feature 424 which carries enhanced spatial awareness and improved discriminative power.

The SAM 400 can be integrated into a wide range of existing convolutional neural networks. The design is computationally efficient, as the attention mechanism operates on reshaped feature maps without introducing significant overhead. The ability to focus on spatially significant regions makes the SAM module 400 architecture effective in scenarios where fine-grained spatial understanding is important.

The spatial attention focuses on the most informational spatial regions. The spatial attention generates a spatial attention map 422 after it applies a convolution on the concatenated feature maps of channel-wise average and max pooling. The attention for the spatial features is defined by the following equation (2).

$$M_s(F) = \sigma(\text{Conv}([\text{AvgPool}(F); \text{MaxPool}(F)])) \quad (2)$$

Where:
σ=the sigmoid activation
Conv=the convolutional operation

The final attention-enhanced feature map is computed as a multiplication of the input feature map by the channel and the spatial attention maps 422 are defined by the following equation (3)

$$F' = M_s(M_c(F) \cdot F) \cdot F \quad (3)$$

By using CBAM, the network learns to emphasize the most significant features in both the channel and spatial dimensions, leading to improved performance in the PD prediction 120. FIG. 5 shows the present disclosure of the C3BAM-Net CNN architecture in visual form.

In one embodiment, C3BAM-Net CNN 514 architecture also referred as C3BAM-Net CNN 210 architecture configured to receive an input also referred to as input layer 502 also referred to as input layer 212 of dimensionality 150×150×3 (height×width×depth). The C3BAM-Net CNN 514 architecture includes, for example, four (4) convolutional layers 504 also referred to as convolution layer 504, each followed by the ReLU activation function 506 also referred to as the ReLU activation function 216 and the max pooling layer 508 also referred to as the max pooling layer 218. A first processing layer has an output shape of 74×74×32.

FIG. 5 shows the detailed explanation of the C3BAM-Net CNN 500 architecture. The C3BAM-Net CNN 500 architecture is also referred to as C3BAM-Net CNN 210 architecture. In an embodiment, the first convolutional layer 504 is configured with a depth of thirty-two (32) filters, each having a kernel size of 3×3, a stride of one (1), and is followed by the ReLU activation function 506.

Post the initial the convolutional layer 504 and the ReLU activation layers 506, the CBAM block 1 514 is integrated into the architecture. The CBAM block 1 514 includes the CAM 510 and the SAM 512, which collectively enhance the network's ability to focus on the most relevant spatial and channel-wise features. The CBAM block 1 514 emphasizes the brain regions that are clinically significant in the context of the PD prediction 120, such as the substantia nigra and basal ganglia, which are known to be predominantly affected.

In one embodiment, FIG. 5 includes a second convolutional layer 516 that is positioned after a CBAM block 1 514 also referred to as first CBAM and referred to as CBAM block 1 224. The CBAM block 1 514 has an output shape of 74×74×32. The second convolutional layer 516 is configured with a depth (number of filters) of 64, a filter kernel size of 3×3, and a stride of 2. Immediately following the convolutional layer 516, the ReLU activation function 518 is applied to introduce non-linearity.

Subsequently, the max-pooling layer 520 is employed, having a filter size of 2×2 and a stride of 2, reducing the spatial dimensions of the feature maps. For all subsequent the convolutional and the pooling layers, the spatial resolution is progressively reduced by a factor of two at each stage. A second processing layer has an output shape of 36×36×64.

Following the max-pooling operation 520, a CBAM block 2 526 also referred to as second CBAM and referred as a CBAM block 2 226 is introduced. The CBAM block 2 526 has an output shape of 36×36×64. The CBAM block 2 526 is followed in sequence by the convolutional layer 516 with a depth of 128, the ReLU activation layer 518, and the max-pooling layer 520 configured identically to the max-pooling pooling layer 508 (i.e., 2×2 filter size and stride of 2). The output feature map dimensions at the stage are 17×17×128.

Post the initial the convolutional layer 516 and the ReLU activation layers 518, the CBAM block 2 526 is integrated into the architecture. The CBAM block 2 526 includes the CAM 522 and the SAM 524, which collectively enhance the network's ability to focus on the most relevant spatial and channel-wise features. The CBAM block 2 526 emphasizes the brain regions that are clinically significant in the context of the PD prediction 120, such as the substantia nigra and basal ganglia, which are known to be predominantly affected.

The CBAM block 3 538 also referred to as third CBAM and referred as a CBAM block 228 is applied, followed by an additional sequence of layers including the convolutional layer 528, the ReLU activation layer 530, and the max-pooling layer 532, consistent with the prior configurations. The CBAM block 3 538 has an output shape of 17×17×128. A third processing layer has an output shape of 17×17×128.

Post the initial the convolutional layer 528 and the ReLU activation layers 530, the CBAM block 3 538 is integrated into the architecture. The CBAM block 3 538 includes the CAM 534 and the SAM 536, which collectively enhance the network's ability to focus on the most relevant spatial and channel-wise features. The CBAM block 3 538 emphasizes the brain regions that are clinically significant in the context of the PD prediction 120, such as the substantia nigra and basal ganglia, which are known to be predominantly affected.

The output, the convolution layer 540, the ReLU activation layer 542 and the max-pooling layer 544. A fourth processing layer has an output shape of 7×7×128. The final max-pooling layer 544 is flattened by passing through the flattening layer 546 also referred to as the flattening layer 230 to transition from spatial feature maps to a one-dimensional feature vector. The vector is passed through a series of fully connected (dense) layers, beginning with the dense layer 550 also referred to as the dense layer 232 of 256 units with the ReLU activation applied, followed by a dense layer of 128 units, and culminating in a final output layer comprising 5 units. The SoftMax activation function is applied at the output layer to facilitate classification into five distinct categories associated with the PD prediction 120.

To enhance the network's ability to focus on salient features, the CBAM modules are strategically integrated after both the first and second convolutional blocks. Each CBAM module sequentially applies the CAM and the SAM mechanisms, enabling the network to selectively emphasize informative features while suppressing irrelevant ones.

The proposed architecture includes, for example, 1.8 million trainable parameters, thereby achieving a balance between computational efficiency and representational capacity, suitable for learning complex patterns from input data.

A summary of the architecture, including layer-wise output dimensions, is provided in Table 1. Table 1 shows the output shape of the different layers discussed in FIG. 5.

TABLE 1

Summary of proposed C3BAM-Net architecture for PD classification

| Layer (type) | Output Shape |
| --- | --- |
| input layer (Input Layer) | (150 × 150 × 3) |
| conv2d (Conv2D) | (148 × 148 × 32) |
| max pooling2d (MaxPooling2D) | (74 × 74 × 32) |
| Cbam 1 (CBAM) | (74 × 74 × 32) |
| conv2d 2 (Conv2D) | (72 × 72 × 64) |
| max pooling2d 1 (MaxPooling2D) | (36 × 36 × 64) |
| cbam 2 (CBAM) | (36 × 36 × 64) |
| conv2d 4 (Conv2D) | (34 × 34 × 128) |
| max pooling2d 2 (MaxPooling2D) | (17 × 17 × 128) |
| cbam 3 (CBAM) | (17 × 17 × 128) |
| conv2d 5 (Conv2D) | (15 × 15 × 128) |
| max pooling2d 3 (MaxPooling2D) | (7 × 7 × 128) |
| flatten 1 (Flatten) | (6272) |
| dense 4 (Dense) | (256) |
| dense 5 (Dense) | (128) |
| dense 6 (Dense) | (64) |
| dense 7 (Dense) | (5) |

In one embodiment, the present disclosure of Training process of C3BAM-Net CNN 210 architecture as shown in FIG. 2 is trained on a processed and augmented datasets 208 also referred as the dataset augmentation 208 of the MRI images 104. The training process is conducted using a set of optimized hyperparameters (HPs), which may include a learning rate of 0.00015 and a momentum value of 0.6001. The batch size is randomly selected and fixed at 64 samples per batch, and the training is executed over a total of 100 epochs.

In an embodiment, for example 70% of the augmented dataset 208 is allocated for training purposes, as described in the dataset preparation section. In FIG. 6, the training process involves iterative optimization of the network weights using backpropagation and gradient descent, guided by the selected hyperparameters. The trained model 608 is subsequently utilized in the testing phase for feature extraction 610 and classification 616.

In the testing phase, the trained C3BAM-Net CNN model 500 is employed to extract high-level discriminative features from unseen the MR images. Through a sequence of convolutional layers, batch normalization layers, and max-pooling layers, which progressively abstract spatial and contextual information from the input images may be achieved The extracted features are further refined using attention mechanisms, specifically the CAM and the SAM integrated within the CBAM blocks. The mechanisms enable the model to selectively emphasize informative channels and spatial regions, enhancing the quality of the learned representations.

FIG. 6 shows testing process and the interpretation. The system 600 includes several interconnected modules, each performing a specific function in the classification pipeline. The process begins with the acquisition of brain scan images, which may be in the form of MRI images 104. The MRI images 104 are divided into training data and testing data. The training data from trained model 608 is used to develop and optimize the neural network model. The testing data 606 is used to evaluate the model's performance and generalization ability.

The trained model 608 also referred to as trained model 240, is developed using a labelled dataset of brain scan images and/or the MRI images 104. The MRI images 104 are pre-processed and passed through the C3BAM-Net CNN 500 architecture that includes the convolutional layers, the ReLU activations, the max-pooling layers, and attention mechanisms. The attention mechanisms are implemented using the CBAM, which apply the CAM 300 and the SAM to enhance the network's focus on diagnostically relevant features. The network is trained using supervised learning, optimizing a loss function such as cross-entropy using an optimizer like Adam.

Post completion of the training, the resulting model is stored and used in the testing model 606. The testing model 606 also referred to as testing model 238 accepts input testing samples new, unlabeled brain scan images and processes them using the trained model 608. The first step in this process is feature extraction 610 also referred to as the feature extraction 242, where the input image is passed through the same convolutional and attention layers used during training. The layers extract hierarchical features that represent the structural and textural patterns in the brain scan. The attention-enhanced feature maps are then passed through a flattening layer 546, which converts the multi-dimensional tensor into a feature vector of size N x 6272, where N denotes the number of test samples.

The feature extracted 610 also referred to as the feature extraction 242, are then passed to a classification phase 612 also referred to as the classification phase 244, which is directly connected to the neural network classifiers 614, a series of fully connected (dense) layers that interpret the features and produce a prediction. The feature extraction 610 involves multiple convolutional and pooling layers that distill the input image into a set of high-level features. The feature vector is subsequently input into a set of neural network classifiers 614. The neural network classifiers 614 also referred to as a neural network classifier 246.

The use of neural network-based classifiers 614 is motivated by their superior ability to model non-linear relationships and capture complex patterns in high-dimensional data. Compared to traditional machine learning classifiers, neural networks offer improved classification accuracy and robustness, particularly in tasks involving subtle inter-class variations, such as distinguishing between different stages of the PD prediction 120.

By evaluating the performance of multiple neural network classifiers on the feature extraction 610, the system ensures a comprehensive assessment of the model's generalization capability. The approach facilitates the identification of the most effective classification strategy for the final deployment of the system. The detailed testing process of the PD classification Using MRI images is shown in FIG. 6

The final layer of the network uses a SoftMax or sigmoid activation function to output a prediction label, such as the PD detected or not. A C3BAM-Net prediction label is the final classification result and is displayed alongside the input testing sample 618. The C3BAM-Net prediction label predicts the PD as mild demented 620, moderate demented 622, the non-demented 624 and severe demented 626 classes.

The final output of the system 600, includes both the classification result and the annotated image with the Grad-CAM overlay. The dual output enhances the interpretability of the model, making it more suitable for clinical use where transparency and trust are important. the system includes a Grad-CAM module 602. The Grad-CAM module 602 also referred to as GRAD-CAM module 234, is tightly integrated with the trained model 608. When a prediction is made, the Grad-CAM module 602 computes the gradient of the predicted class score with respect to the feature maps of the last convolutional layer. The gradients are used to weigh the feature maps, and the result is passed through the ReLU activation to generate a heatmap 604. The heatmap 604 also referred to as heat map 236, highlights the regions of the input image that most influenced the model's decision.

The Grad-CAM module 602 output is overlaid on the original brain scan image, providing a visual explanation of the classification. The system 600 may be implemented as a standalone software application, a cloud-based service, or integrated into existing medical imaging platforms. The system 600 may also include a user interface that allows clinicians to upload testing data 606, view classification results, and interact with the visual explanations. The interpretability feature is especially valuable in medical applications, where understanding the rationale behind a diagnosis is critical.

Figure 7:
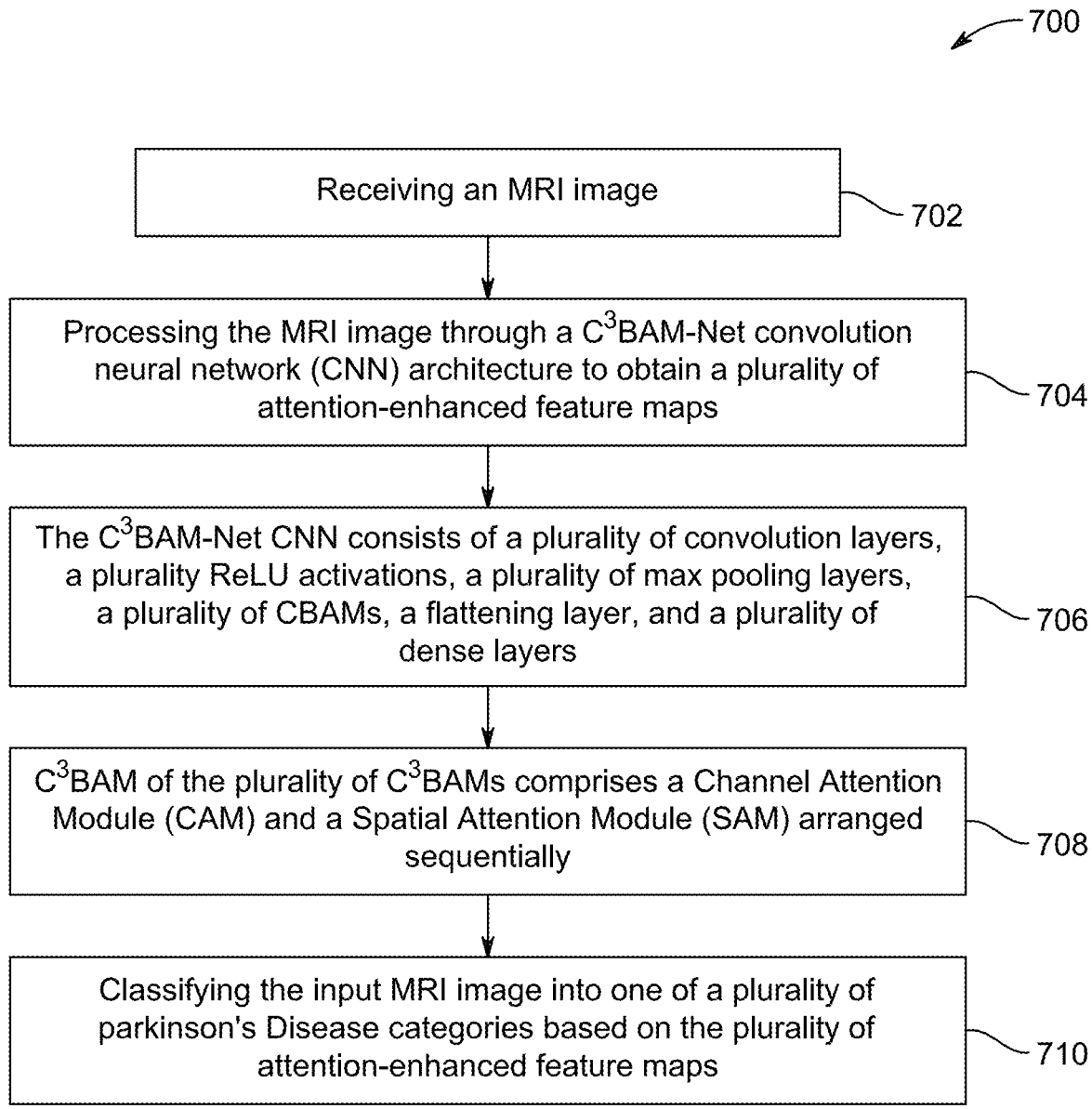
FIG. 7 is a methodology flow chart of the PD classification using the MRI data.

FIG. 7 illustrates a flowchart of a method 700 for a computer-implemented method for classifying the PD from the MRI data, according to certain embodiments. In an embodiment the system 100 includes the MRI images 104 obtained from the MRI device 102. The MRI images 104 are sent to the processing unit 108 through the network 106. The system 100 includes one or more data storage devices or the database 112. The processing unit is coupled to the classifier unit 110 to classify the data and the PD prediction 120 are obtained. The method 700 includes a series of steps. The sequence of steps of the flow chart may not be necessarily executed in the same order as they are presented. Further, one or more steps may be grouped together and performed in the form of a single step, or one step may have several sub-steps that may be performed in parallel or in a sequential manner. The steps of the method of the present disclosure will now be explained with reference to FIG. 1.

At step 702, the method 700 includes receiving the MRI images 104.

At step 704, the method 700 includes processing the MRI image through a C3BAM-Net CNN (shown as C3BAM) architecture to obtain a plurality of attention-enhanced feature maps.

At step 706, the method 700 includes the C3BAM-Net CNN 500 consists of a plurality of convolutional layers, a plurality ReLU activations, a plurality of max pooling layers, a plurality of CBAMs, a flattening layer, and a plurality of dense layers.

In one embodiment, the C3BAM-Net CNN 500 has an input shape of 150×150×3.

In one embodiment, the C3BAM-Net CNN 500 has an output shape of 5.

In one embodiment, the C3BAM-Net CNN 500 has an architecture includes a first processing layer, a first CBAM coupled to the first processing layer, a second processing layer coupled to the first CBAM, a second CBAM coupled to the second processing layer, a third processing layer, coupled to the second CBAM, a third CBAM coupled to the third processing layer and a fourth processing layer coupled to the third CBAM.

In one embodiment, the processing layer includes a convolution layer, a max pooling layer, and a ReLU activation.

In one embodiment, the first processing layer has an output shape of 74×74×32.

In one embodiment, the first CBAM has an output shape of 74×74×32.

In one embodiment, the second processing layer has an output shape of 36×36×64.

In one embodiment, the second CBAM has an output shape of 36×36×64.

In one embodiment, the third processing layer has an output shape of 17×17×128.

In one embodiment, the third CBAM has an output shape of 17×17×128.

In one embodiment, the fourth processing layer has an output shape of 7×7×128.

In one embodiment, the C3BAM-Net CNN 500 has four dense layers.

In one embodiment, the C3BAM-Net CNN 500 further includes Gradient-weighted Class Activation Mapping (Grad-CAM).

At step 708, the method 700 includes the CBAM of the plurality of CBAMs includes a Channel Attention Module (CAM) 300 and a Spatial Attention Module (SAM) 400 arranged sequentially.

In one embodiment, the CBAM generates an attention-enhanced feature map by applying a channel attention weight and a spatial attention weight to an input feature map, then multiplying the input feature map.

In one embodiment, the CBAM generates an attention-enhanced feature map following a mathematical description as:

$$F'=M_s(M_c(F) \cdot F) \cdot F$$

wherein F is an input feature map, Ms denotes a spatial attention function, and Mc denotes a channel attention function.

In one embodiment, the CAM generates a channel attention weight by processing feature maps using global average pooling and global max pooling.

In one embodiment, the CAM generates a channel attention weight following a mathematical description as:

$$M_c(F)=\sigma(W_2(ReLU(W_1(AvgPool(F)))))+\sigma(W_2(ReLU(W_1(MaxPool(F)))))$$

wherein $W_1$ and $W_2$ are weight matrices of a shared multi-layer perceptron (MLP), σ denotes a sigmoid function, and F is an input feature map.

In one embodiment, the SAM generates a spatial attention weight by processing feature maps using channel-wise average pooling and max pooling.

In one embodiment, the SAM generates a spatial attention weight following a mathematical description as:

$$M\_s(F)=\sigma(Conv([AvgPool(F);MaxPool(F)])),$$

wherein σ is a sigmoid function, Conv denotes a convolutional operation, AvgPool denotes average pooling operation, and MaxPool denotes max pooling operation.

At step 710, the method 700 includes classifying the input MRI image into one of a plurality of Parkinson's Disease categories based on the plurality of attention-enhanced feature maps.

The results of the present disclosure demonstrate the high effectiveness of the C3BAM-XAI architecture in addressing critical challenges in the PD stage classification and/or the PD detection. By integrating the CBAM attention module into a custom lightweight CNN and employing the Grad-CAM model for interpretability. The C3BAM-XAI architecture achieved superior classification accuracy and enhanced model transparency compared to conventional deep learning approaches, while utilizing significantly fewer parameters. The model achieved classification significant accuracy on the training datasets. The performance improvements are attributed to the attention mechanisms, which enabled the model to focus on interrelated features by emphasizing salient spatial regions and feature channels.

The C3BAM-XAI enhances the AI-driven medical imaging software by improving the PD stage classification and interpretability, providing a competitive edge.

Figure 8:
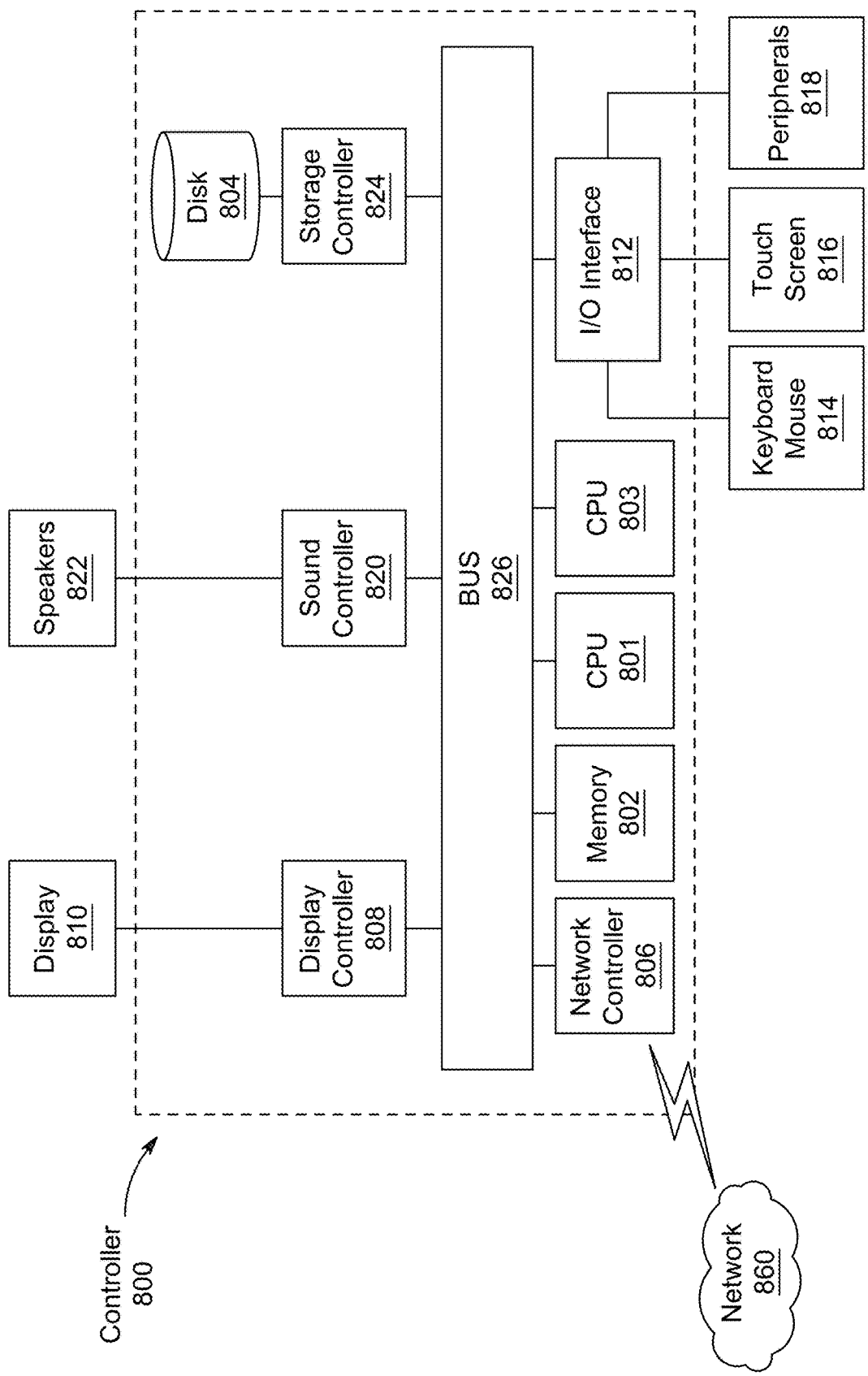
FIG. 8 is an illustration of a non-limiting example of details of computing hardware used in the computing system, according to certain embodiments.

Next, further details of the hardware description of the computing environment according to exemplary embodiments are described with reference to FIG. 8. In FIG. 8, a controller 800 is described as representative of the system in which the controller is a computing device which includes a CPU 801 which performs the processes described above/below. The process data and instructions may be stored in memory 802. These processes and instructions may also be stored on a storage medium disk 804 such as a hard drive (HDD) or portable storage medium or may be stored remotely.

Further, the present disclosure is not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the present disclosure may be provided as a utility application, background daemon, or component of an operating system, or combination thereof, executing in conjunction with CPU 801, 803 and an operating system such as Microsoft Windows 8, Microsoft Windows 10, UNIX, LINUX, Apple MAC-OS and other systems known to those skilled in the art.

The hardware elements in order to achieve the computing device may be realized by various circuitry elements, known to those skilled in the art. For example, CPU 801 or CPU 803 may be a Xenon or Core processor from Intel of America or an Opteron processor from AMD of America, or maybe other processor types that would be recognized by one of ordinary skill in the art. Alternatively, the CPU 801 and 803 may be implemented on an FPGA, ASIC, PLD or using discrete logic circuits, as one of the ordinary skills in the art would recognize. Further, CPU 801 and 803 may be implemented as multiple processors cooperatively working in parallel to perform the instructions of the inventive processes described above.

The computing device in FIG. 8 also includes a network controller 806, such as an Intel Ethernet PRO network interface card from Intel Corporation of America, for interfacing with network 860. As can be appreciated, the network 860 can be a public network, such as the Internet, or a private network such as an LAN or WAN network, or any combination thereof and can also include PSTN or ISDN sub-networks. The network 860 can also be wired, such as an Ethernet network, or can be wireless such as a cellular network including EDGE, 3G, 4G, and 5G wireless cellular systems. The wireless network can also be WiFi, Bluetooth, or any other wireless form of communication that is known.

The computing device further includes a display controller 808, such as a NVIDIA GeForce GTX or Quadro graphics adaptor from NVIDIA Corporation of America for interfacing with display 810, such as a Hewlett Packard HPL2445w LCD monitor. A general purpose I/O interface 812 interfaces with a keyboard and/or mouse 814 as well as a touch screen panel 816 on or separate from display 810. General purpose I/O interface also connects to a variety of peripherals 818 including printers and scanners, such as an OfficeJet or DeskJet from Hewlett Packard.

A sound controller 820 is also provided in the computing device such as Sound Blaster X-Fi Titanium from Creative, to interface with speakers/microphone 822 thereby providing sounds and/or music.

The general-purpose storage controller 824 connects the storage medium disk 804 with communication bus 826, which may be an ISA, EISA, VESA, PCI, or similar, for interconnecting all of the components of the computing device. A description of the general features and functionality of the display 810, keyboard and/or mouse 814, as well as the display controller 808, storage controller 824, network controller 806, sound controller 820, and general purpose I/O interface 812 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 9.

Figure 9:
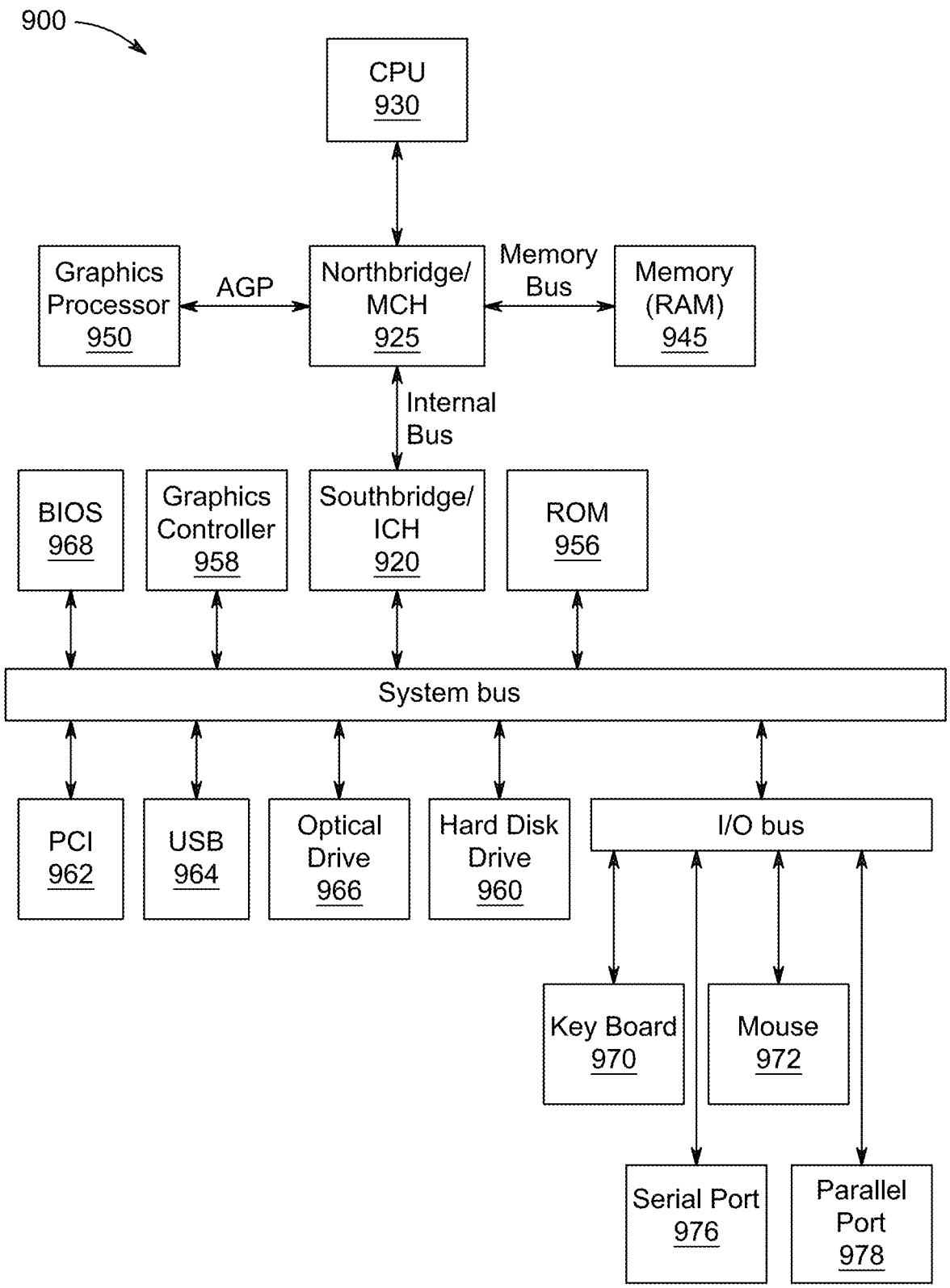
FIG. 9 is an exemplary schematic diagram of a data processing system used within the computing system, according to certain embodiments.

FIG. 9 shows a schematic diagram of a data processing system, according to certain embodiments, for performing the functions of the exemplary embodiments. The data processing system is an example of a computer in which code or instructions implementing the processes of the illustrative embodiments may be located.

In FIG. 9, data processing system 900 employs a hub architecture including a north bridge and memory controller hub (NB/MCH) 925 and a south bridge and input/output (I/O) controller hub (SB/ICH) 920. The central processing unit (CPU) 930 is connected to NB/MCH 925. The NB/MCH 925 also connects to the memory 945 via a memory bus and connects to the graphics processor 950 via an accelerated graphics port (AGP). The NB/MCH 925 also connects to the SB/ICH 920 via an internal bus (e.g., a unified media interface or a direct media interface). The CPU Processing unit 930 may contain one or more processors and even may be implemented using one or more heterogeneous processor systems.

Figure 10:
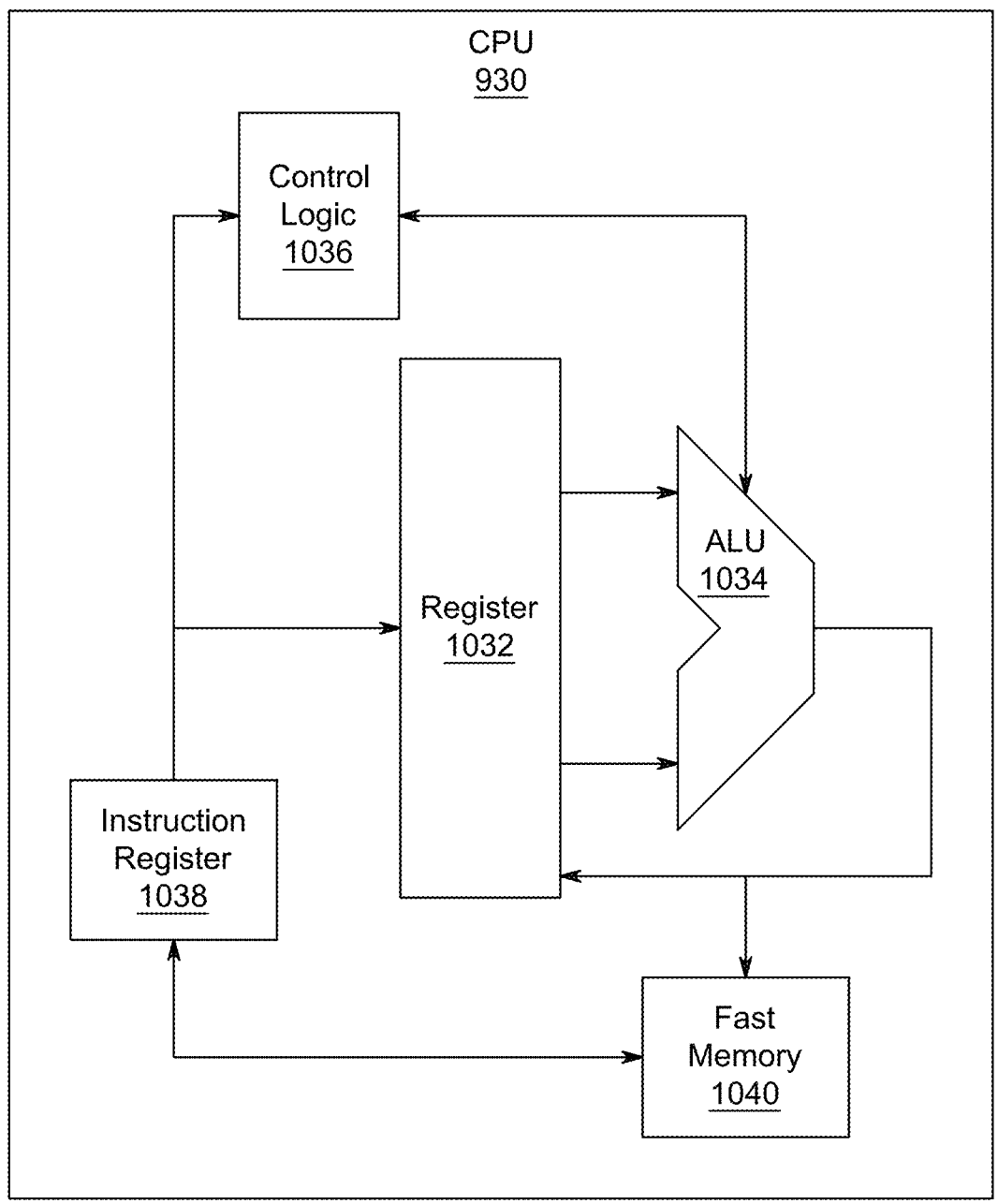
FIG. 10 is an exemplary schematic diagram of a processor used with the computing system, according to certain embodiments.

For example, FIG. 10 shows one implementation of CPU 930. In one implementation, the instruction registers 1039 retrieves instructions from the fast memory 1040. At least part of these instructions is fetched from the instruction register 1039 by the control logic 1036 and interpreted according to the instruction set architecture of the CPU 930. Part of the instructions can also be directed at the register 1032. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 1034 that loads values from the register 1032 and performs logical and mathematical operations on the loaded values according to the instructions. The results from these operations can be feedback into the register and/or stored in the fast memory 1040. According to certain implementations, the instruction set architecture of the CPU 930 can use a reduced instruction set architecture, a complex instruction set architecture, a vector processor architecture, and a very large instruction word architecture. Furthermore, the CPU 930 can be based on the Von Neuman model or the Harvard model. The CPU 930 can be a digital signal processor, an FPGA, an ASIC, a PLA, a PLD, or a CPLD. Further, the CPU 930 can be an x96 processor by Intel or by AMD; an ARM processor, a Power architecture processor by, e.g., IBM; a SPARC architecture processor by Sun Microsystems or by Oracle; or other well-known CPU architecture.

Referring again to FIG. 9, the data processing system 900 can include that the SB/ICH 920 is coupled through a system bus to an I/O Bus, a read only memory (ROM) 956, universal serial bus (USB) port 964, a flash binary input/output system (BIOS) 968, and a graphics controller 959. PCI/PCIe devices can also be coupled to SB/ICH 999 through a PCI bus 962.

The PCI devices may include, for example, Ethernet adapters, add-in cards, and PC cards for notebook computers. The Hard disk drive 960 and CD-ROM 966 can use, for example, an integrated drive electronics (IDE) or serial advanced technology attachment (SATA) interface. In one implementation the I/O bus can include a super I/O (SIO) device.

Further, the hard disk drive (HDD) 960 and optical drive 966 can also be coupled to the SB/ICH 920 through a system bus. In one implementation, a keyboard 970, a mouse 972, a parallel port 978, and a serial port 976 can be connected to the system bus through the I/O bus. Other peripherals and devices that can be connected to the SB/ICH 920 using a mass storage controller such as SATA or PATA, an Ethernet port, an ISA bus, an LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes in battery sizing and chemistry or based on the requirements of the intended back-up load to be powered.

Figure 11:
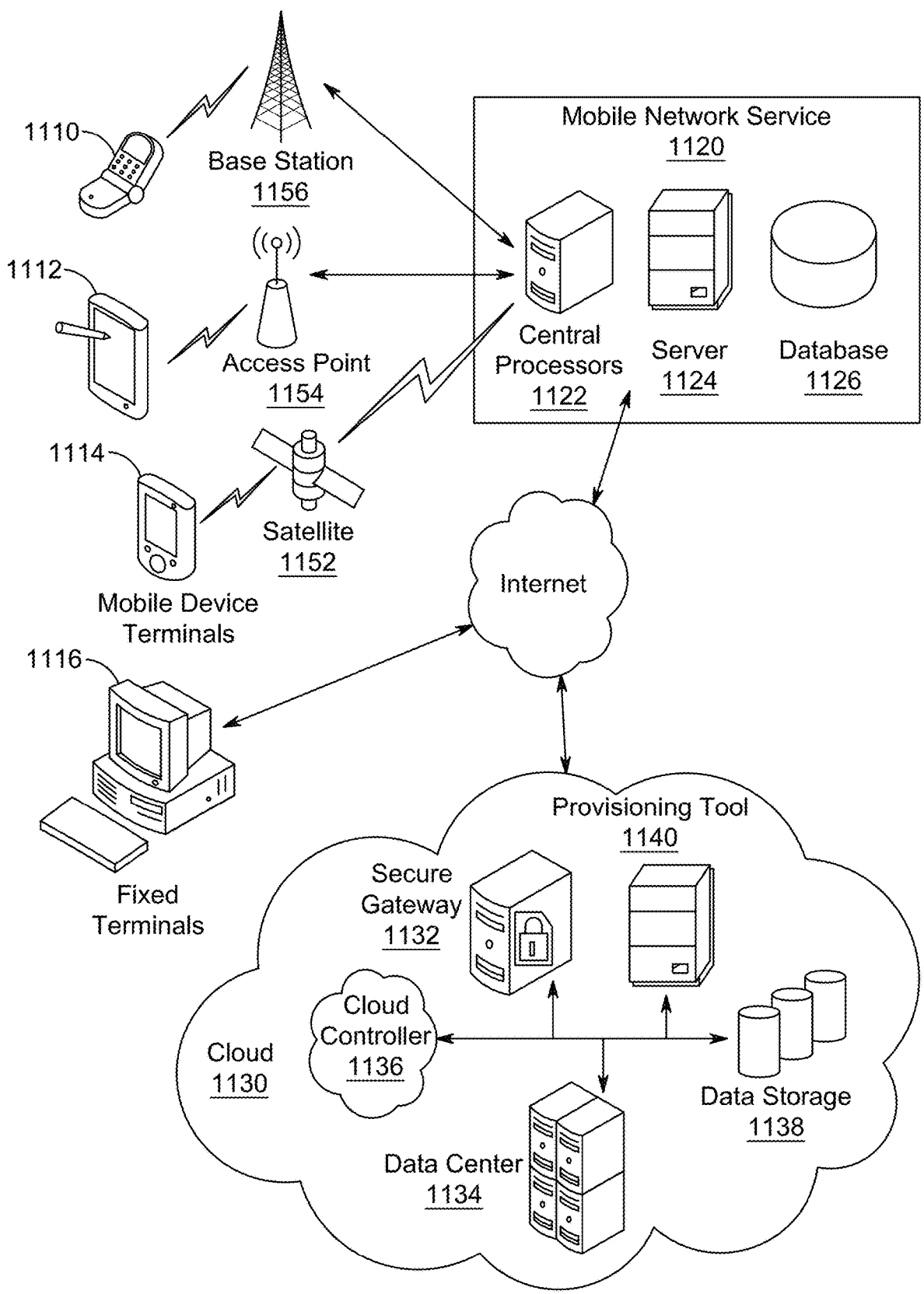
FIG. 11 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more clients and server machines, which may share processing, as shown by FIG. 11, in addition to various human interface and communication devices (e.g., display monitors, smart phones, tablets, personal digital assistants (PDAs)). More specifically, FIG. 11 illustrates client devices including a smart phone 1111, a tablet 1112, a mobile device terminal 1114 and fixed terminals 1116. These client devices may be commutatively coupled with a mobile network service 1120 via a base station 1156, an access point 1154, a satellite 1152 or via an internet connection. The mobile network service 1120 may comprise central processors 1122, a server 1124 and a database 1126. The fixed terminals 1116 and the mobile network service 1120 may be commutatively coupled via an internet connection to functions in cloud 1130 that may comprise a security gateway 1132, a data center 1134, a cloud controller 1136, a data storage 1138 and a provisioning tool 1140. The network may be a private network, such as the LAN or the WAN, or maybe the public network, such as the Internet. Input to the system may be received via direct user input and received remotely either in real-time or as a batch process. Additionally, some implementations may be performed on modules or hardware not identical to those described. Accordingly, other implementations are within the scope that may be disclosed.

The above-described hardware description is a non-limiting example of corresponding structure for performing the functionality described herein.

Numerous modifications and variations of the present disclosure are possible in light of the above teachings. It is therefore to be understood that the invention may be practiced otherwise than as specifically described herein.

The invention claimed is:

1. A computer-implemented method for classifying Parkinson's Disease (PD) from magnetic resonance imaging (MRI) data, the method comprising:
   receiving an MRI image;
   processing the MRI image through a C3BAM-Net convolutional neural network (CNN) architecture to obtain a plurality of attention-enhanced feature maps;
   classifying the input MRI image into one of a plurality of Parkinson's Disease categories based on the plurality of attention-enhanced feature maps,
   wherein the C3BAM-Net CNN comprises a plurality of convolutional layers, a plurality of Rectified Linear Unit (ReLU) activations, a plurality of max pooling layers, a plurality of Convolutional Block Attention Modules (CBAMs), a flattening layer, and a plurality of dense layers; and
   wherein each CBAM of the plurality of CBAMs comprises a Channel Attention Module (CAM) and a Spatial Attention Module (SAM) arranged sequentially.

2. The method of claim 1, wherein the CBAM generates an attention-enhanced feature map by applying a channel attention weight and a spatial attention weight to an input feature map, then multiplying the input feature map.

3. The method of claim 1, wherein the CBAM generates an attention-enhanced feature map following a mathematical description as:

$$F'=M_s(M_c(F)\cdot F)\cdot F,$$

wherein F is an input feature map, $M_s$ denotes a spatial attention function, and $M_c$ denotes a channel attention function.

4. The method of claim 1, wherein the CAM generates a channel attention weight by processing feature maps using global average pooling and global max pooling.

5. The method of claim 1, wherein the CAM generates a channel attention weight following a mathematical description as:

$$M_c(F)=\sigma(W_2(\text{ReLU}(W_1(\text{AvgPool}(F)))))+\sigma(W_2(\text{ReLU}(W_1(\text{MaxPool}(F))))),$$

wherein $W_1$ and $W_2$ are weight matrices of a shared multi-layer perceptron (MLP), σ denotes a sigmoid function, and F is an input feature map.

6. The method of claim 1, wherein the SAM generates a spatial attention weight by processing feature maps using channel-wise average pooling and max pooling.

7. The method of claim 1, wherein the SAM generates a spatial attention weight following a mathematical description as:

$$M_s(F)=\sigma(\text{Conv}([\text{AvgPool}(F);\text{MaxPool}(F)])),$$

wherein σ is a sigmoid function, Conv denotes a convolutional operation, AvgPool denotes average pooling operation, and MaxPool denotes max pooling operation.

8. The method of claim 1, wherein the C3BAM-Net CNN has an input shape of 150×150×3.

9. The method of claim 1, wherein the C3BAM-Net CNN has an output shape of 5.

10. The method of claim 1, wherein the C3BAM-Net CNN has an architecture comprises:
    a first processing layer;
    a first CBAM coupled to the first processing layer;
    a second processing layer coupled to the first CBAM;
    a second CBAM coupled to the second processing layer;
    a third processing layer, coupled to the second CBAM;
    a third CBAM coupled to the third processing layer; and
    a fourth processing layer coupled to the third CBAM.

11. The C3BAM-Net CNN architecture of claim 10, wherein the processing layer comprises a convolution layer, a max pooling layer, and a ReLU activation.

12. The C3BAM-Net CNN architecture of claim 10, wherein the first processing layer has an output shape of 74×74×32.

13. The C3BAM-Net CNN architecture of claim 10, wherein the first CBAM has an output shape of 74×74×32.

14. The C3BAM-Net CNN architecture of claim 10, wherein the second processing layer has an output shape of 36×36×64.

15. The C3BAM-Net CNN architecture of claim 10, wherein the second CBAM has an output shape of 36×36×64.

16. The C3BAM-Net CNN architecture of claim 10, wherein the third processing layer has an output shape of 17×17×128.

17. The C3BAM-Net CNN architecture of claim 10, wherein the third CBAM has an output shape of 17×17×128.

18. The C3BAM-Net CNN architecture of claim 10, wherein the fourth processing layer has an output shape of 7×7×128.

19. The method of claim 1, wherein the C3BAM-Net CNN has four dense layers.

20. The method of claim 1, wherein the C3BAM-Net CNN further comprises Gradient-weighted Class Activation Mapping (Grad-CAM).

* * * * *